US012027023B2

(12) United States Patent
Buksbaum et al.

(10) Patent No.: US 12,027,023 B2
(45) Date of Patent: Jul. 2, 2024

(54) TOUCHLESS MODULAR CONTAINMENT SYSTEM

(71) Applicant: Visual Graphic Systems Inc., Carlstadt, NJ (US)

(72) Inventors: Matt Buksbaum, Hoboken, NJ (US); Patrick Benasillo, Rochelle Park, NY (US)

(73) Assignee: Visual Graphic Systems Inc., Carlstadt, NJ (US)

( * ) Notice: Subject to any disclaimer, the term of this patent is extended or adjusted under 35 U.S.C. 154(b) by 339 days.

(21) Appl. No.: 17/479,434

(22) Filed: Sep. 20, 2021

(65) Prior Publication Data

US 2022/0092905 A1 Mar. 24, 2022

Related U.S. Application Data

(60) Provisional application No. 63/081,153, filed on Sep. 21, 2020.

(51) Int. Cl.
*G07F 9/00* (2006.01)
*G07F 11/18* (2006.01)

(52) U.S. Cl.
CPC .............. *G07F 9/009* (2020.05); *G07F 9/006* (2013.01); *G07F 11/18* (2013.01)

(58) Field of Classification Search
CPC .. G07F 11/18; G07F 17/0064; G07C 9/00111; G07C 2009/0092; G07C 2009/00769; G06Q 30/0621
See application file for complete search history.

(56) References Cited

U.S. PATENT DOCUMENTS

2016/0019367 A1* 1/2016 Olson .................... A47B 88/40 312/333
2018/0357843 A1* 12/2018 Zurkuhlen .............. G07F 17/12
2019/0304238 A1* 10/2019 Ambauen ........ G06Q 20/40145

* cited by examiner

*Primary Examiner* — Vernal U Brown
(74) *Attorney, Agent, or Firm* — Leason Ellis LLP

(57) ABSTRACT

A touchless modular containment system for delivering one or more articles to a person includes a modular frame that defines a plurality of discrete cubbies. Each cubby has a front door that is coupled to the modular frame and includes a sliding drawer assembly for controllably delivering the one or more articles to the person. The sliding drawer assembly has a base tray that is secured to the modular frame. The sliding drawer assembly has a movable traveler assembly that defines a top surface of the sliding drawer assembly and moves between a fully extended position and a fully retracted position. A front of the traveler assembly is positioned relative to and adjacent the front door such that forward driving of the traveler assembly toward the fully extended position opens the front door by the traveler assembly urging the front door open without any interaction between the person and the front door.

16 Claims, 26 Drawing Sheets

TOUCHLESS MODULAR CONTAINMENT SYSTEM

CROSS-REFERENCE TO RELATED APPLICATION

The present application claims priority to and the benefit of U.S. patent application Ser. No. 63/081,153, filed on Sep. 21, 2020, which is hereby incorporated by reference in its entirety.

TECHNICAL FIELD

This disclosure concerns a touchless modular containment system and method, and, more particularly, a system of cubbies, modularly and reconfigurably mountable on a skeletal support, with access to the cubbies given to identified customers.

BACKGROUND

There is an increasing need for walk-up and drive-thru structures which provide secure storage of food and other items which have been ordered or preordered until the customer claims the item(s). There is also a perceived need to provide optimal sanitary conditions to combat widespread illness, seasonal illness, and more severe health threats, such as the ongoing COVID pandemic. Many people feel more comfortable touching less public surfaces given many germs and viruses can be spread via high contact public surfaces.

The present disclosure addresses these needs and more.

SUMMARY

In one embodiment, a touchless modular containment system for delivering one or more articles to a person is provided and includes a modular frame that defines a plurality of discrete cubbies. Each cubby has a front door that is coupled to the modular frame and opens outwardly to provide access to the cubby. The system further includes a plurality of sliding drawer assemblies. Each cubby contains one sliding drawer assembly for controllably delivering the one or more articles to the person. The sliding drawer assembly has a base tray that is secured to the modular frame. The sliding drawer assembly has a movable traveler assembly that defines a top surface of the sliding drawer assembly and moves between a fully extended position and a fully retracted position. The slider drawer assembly includes an actuator for linearly moving the movable traveler assembly between the fully extended position and the fully retracted position.

A front of the traveler assembly is positioned relative to and adjacent the front door such that forward driving of the traveler assembly toward the fully extended position opens the front door by the traveler assembly urging the front door open without any interaction between the person and the front door. In this way, the delivery is touchless in that the person does not have to touch the front door to access the article(s). In fact, the front door preferably includes no handle or other hardware so as to prevent the person from opening the front door and by recessing the front door relative to the surrounding modular frame, the person (customer) cannot engage the edge of the front door in an effort to open it.

BRIEF DESCRIPTION OF THE DRAWING FIGURES

DETAILED DESCRIPTION OF CERTAIN EMBODIMENTS

Submitted herewith are illustrations concerning embodiments of a touchless modular containment system and method that comprise the present disclosure.

Figure 1:
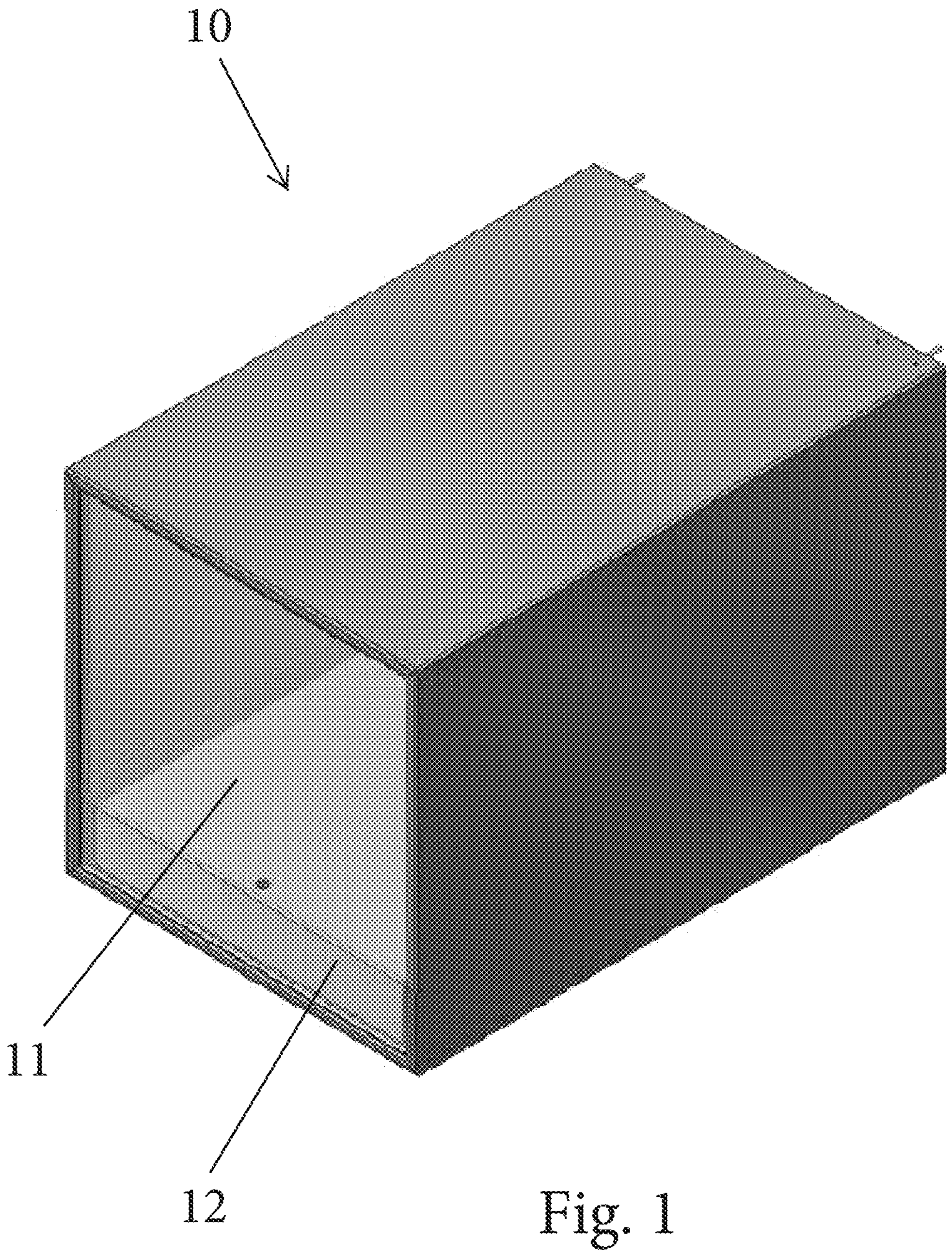
FIG. 1 is a perspective view of a cubby that is to be incorporated into a touchless modular containment system.

FIG. 1 illustrates a cubby 10 in closed and open positions in accordance with an embodiment consistent with the present disclosure. The cubby 10 transitions from a closed, locked state to an open state for retrieval of items once a customer has indicated his or her presence and readiness to claim his or her items. Behind a front facing surface 11, such as the transparent door in FIG. 1, a pedestal 12 advances as the cubby 10 is opened. In embodiments consistent with the disclosure, a motor transitions the cubby 10 to the open state to enable items to be retrieved. In embodiments consistent with the disclosure, the same motor transitions the cubby 10 to the closed state, such as after a period of time or detection that the customer has retrieved his or her items. With the transition to open and closed states, the pedestal 12 is moved by the motor in certain embodiments according to the disclosure. The front facing surface (e.g., glass panel) 11 of the cubby can move outward in a linear manner together with the pedestal 12 or can be arranged like a door. In implementations of interest to the inventors, the cubby 10 transitions between open and closed states in a touchless manner, meaning that the customer need only reach to the pedestal 12 to retrieve his or her items and the movement is otherwise fully automated.

The cubbies 10 can include a lock in certain embodiments to prevent manual opening of the cubby. In other embodiments, the motor mechanism provides the lock by preventing relative movement of the cubby 10 door except when the motor is actuated. The lock can be a magnetic based system in which a magnetic lock mechanism can be energized to place the lock in a locked position and in its deenergized state, the cubby 10 is free to move in a linear manner between the fully extended and fully retracted positions. The lock mechanism is thus located between a moving part of the cubby 10, such as the pedestal, and a stationary part of the cubby 10.

Figure 2:
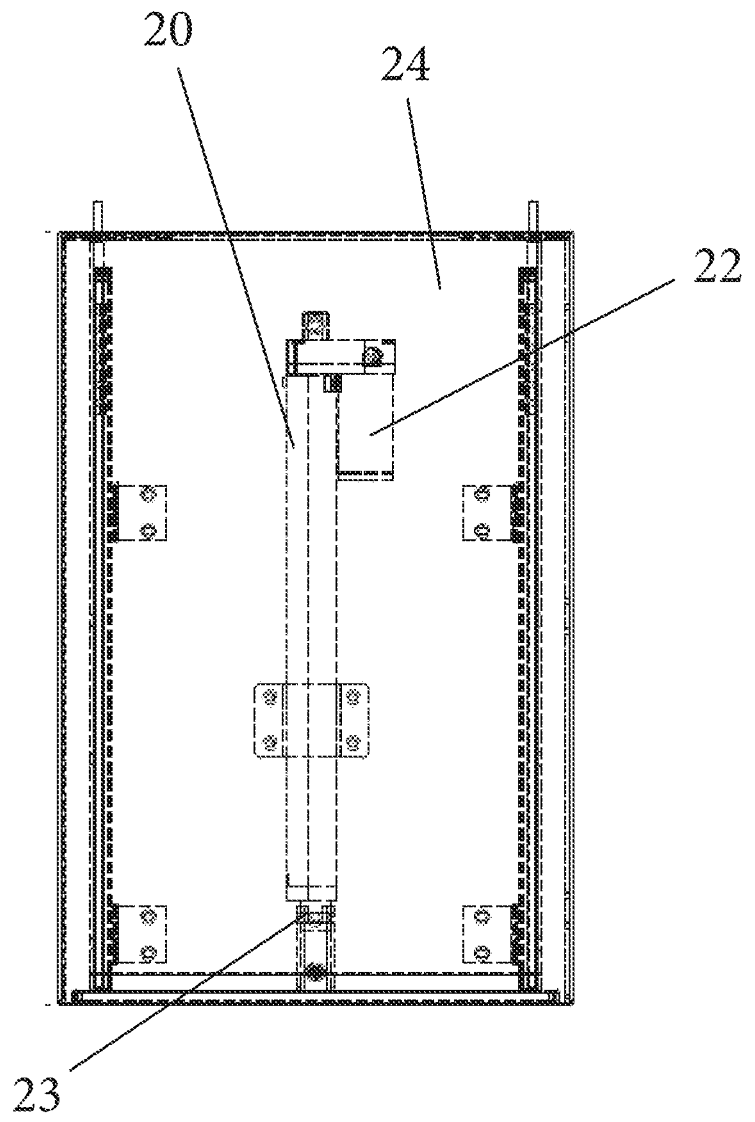
FIG. 2 is a top plan view of the cubby with inner operating parts being shown for sake of illustration and teaching.
Figure 3:
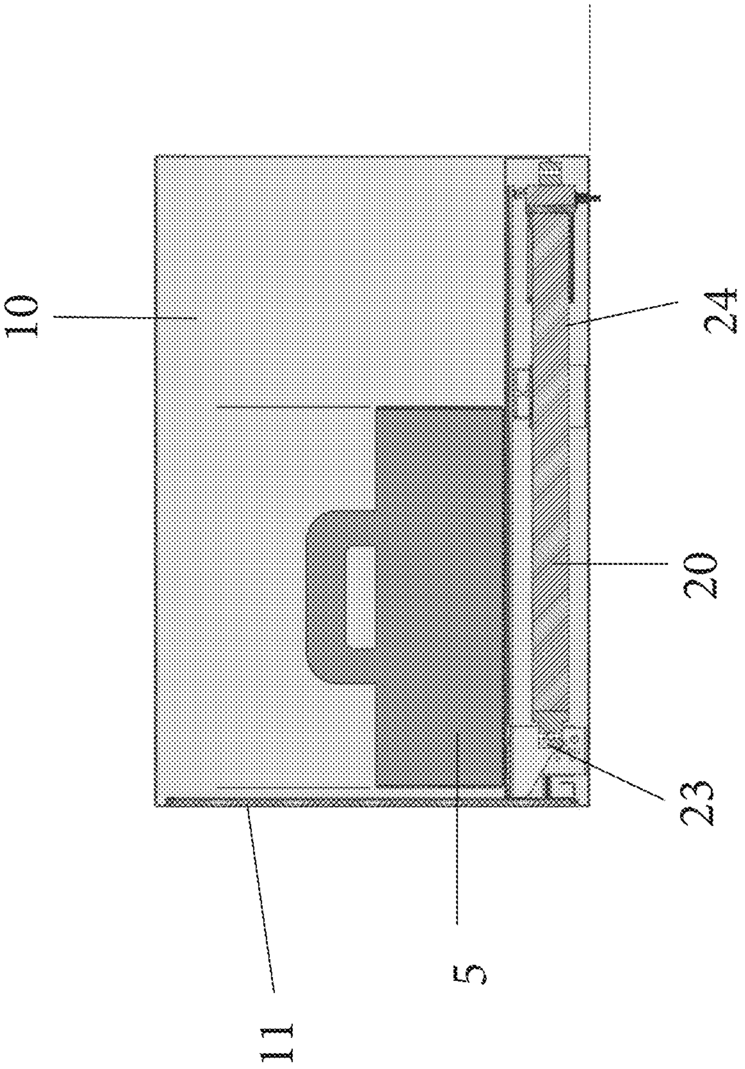
FIG. 3 is a longitudinal cross-sectional view of the cubby.

FIGS. 2 and 3 show additional details of the cubby 10 including the motorization thereof. In one embodiment, the motor is part of a linear actuator 20 that includes a motor 22 and has an extendable piston rod 23 that is operatively connected to the pedestal 12. An article 5, such as a food item, is shown in FIG. 3 on top of the pedestal 12. The linear actuator 20 is fixedly attached to a base wall 24, while the piston rod 23 is driven between the extended state in which the pedestal 12 is advanced forwardly and a retracted position in which the pedestal 12 is in a fully retracted position and access to the article or articles 5 is prevented. The motor 22 controls operation of the piston rod 23 and moves it between the fully extended state and the fully retracted state. The piston rod 23 can be connected to the underside of the pedestal 12 by a bracket or the like as shown.

In motorized embodiments as discussed herein, additional mechanical components are included to move the pedestal 12 in a stable way, including tracks, gears and sliders, as will be understood in the art. For applications involving food, food-grade materials such as stainless steel are to be used. Further, for food-handling applications, the cubbies 10 and the entire structure can be assembled so as to provide access to the parts exposed to any items for regular cleaning.

Figure 4:
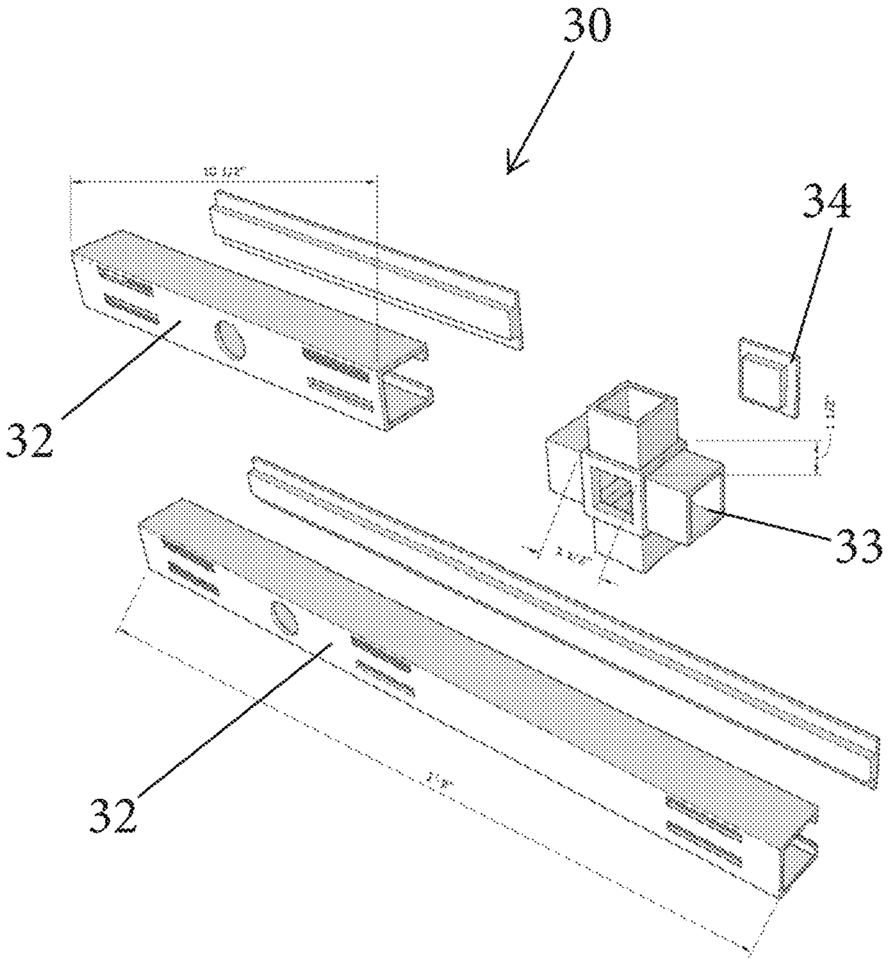
FIG. 4 is a perspective view of a connector subsystem.
Figure 5:
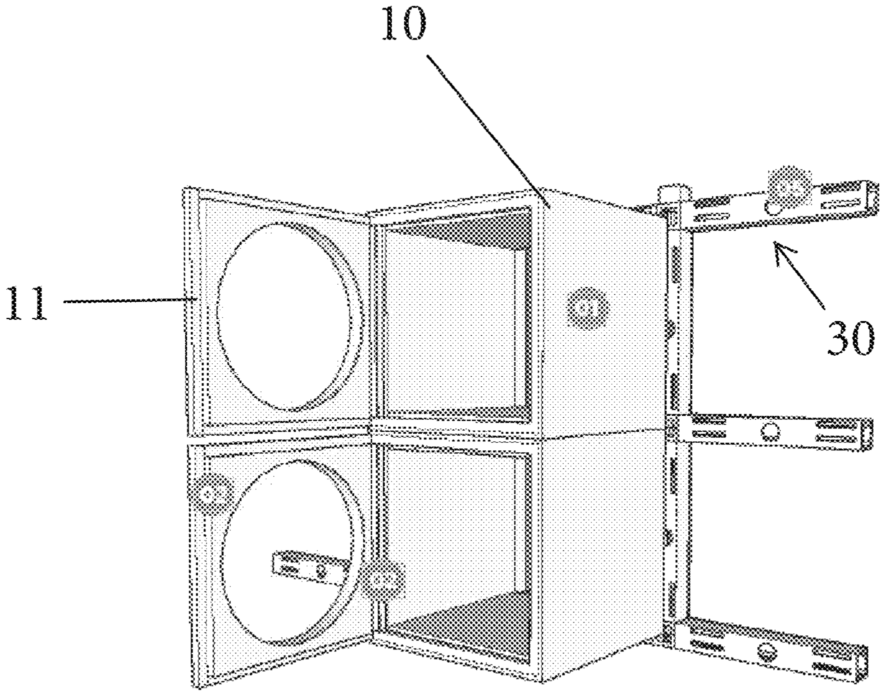
FIG. 5 is a front perspective view of a connector subsystem with two cubbies being shown.
Figure 6:
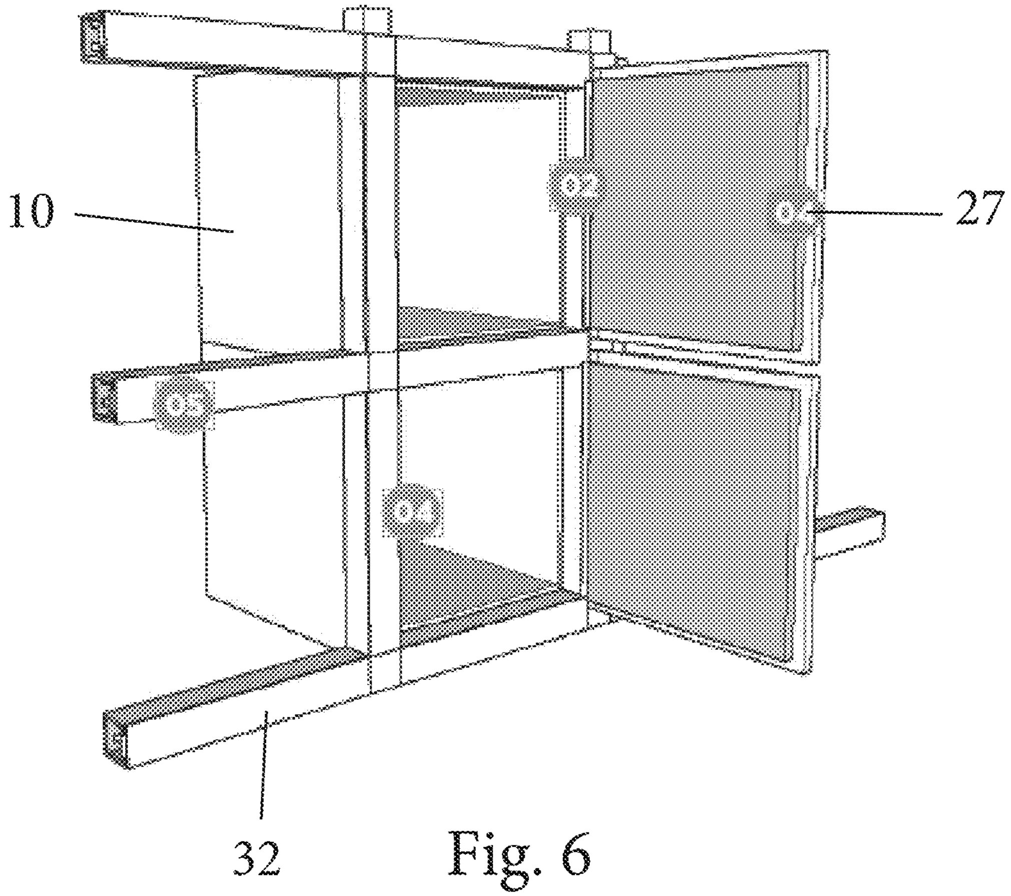
FIG. 6 is a rear perspective view of the connector subsystem and two cubbies of FIG. 5.

Turning now to FIG. 4, a system in accordance with the disclosure includes a connector subsystem 30 in which rails 32 of various sizes are constructed to mate with a connector 33 and define a skeletal arrangement to which cubbies 10 of one or more sizes can be attached. The connectors 33 can have male engagement elements to secure corresponding female receptacles at the ends of respective rails 32. End caps 34 can be provided to complete the appearance of the rails 32 and connector 33. In FIG. 5, the connector subsystem 30 is partially assembled with horizontal and vertical rails 32 connected by corresponding connectors 33 and further shows two cubbies 10 from a front perspective, shown mounted to the resulting skeletal structure. FIG. 6 shows the same two cubbies 10 from a rear view. The rear view shows where store or restaurant employees load items into the cubbies 10, and further shows the end caps seated on the rails and connectors to provide a finished appearance. A rear door 27 can be provided for each cubby 10. Cubbies 10 can be detached by authorized persons and reattached in different arrangements to meet the needs of the retailer and its products. As shown, the cubbies 10 can be connected to the connector subsystem 30 using hooks or the like that protrude from the rear of the cubby 10 and engage slots in the connectors.

Figure 7:
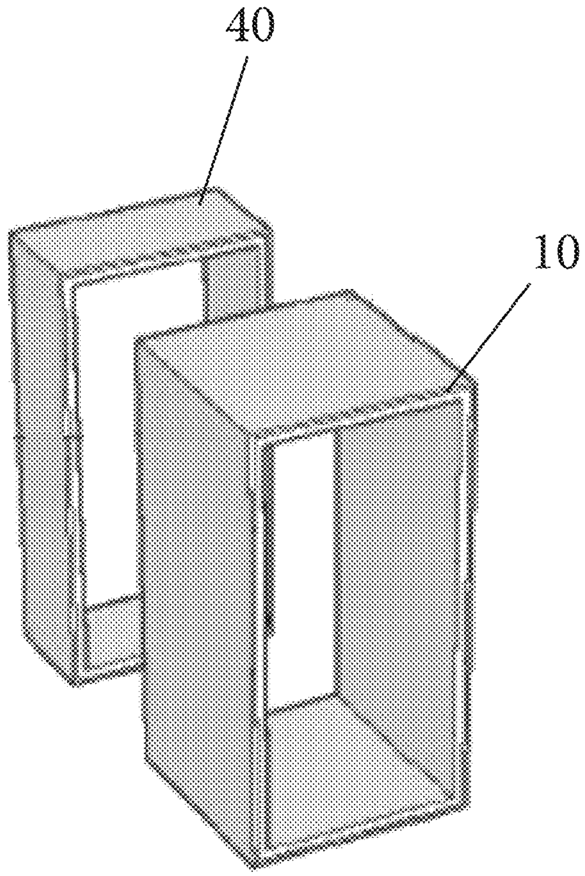
FIG. 7 is a perspective view of a cubby extender.

FIG. 7 shows an optional cubby extender 40 which can be attached between the cubby 10 and the skeletal connector subsystem in order to increase the depth of a given cubby 10 without having to change other structural features of the cubby. This can be useful when certain products or food items warrant a deeper cubby construction.

Figure 8:
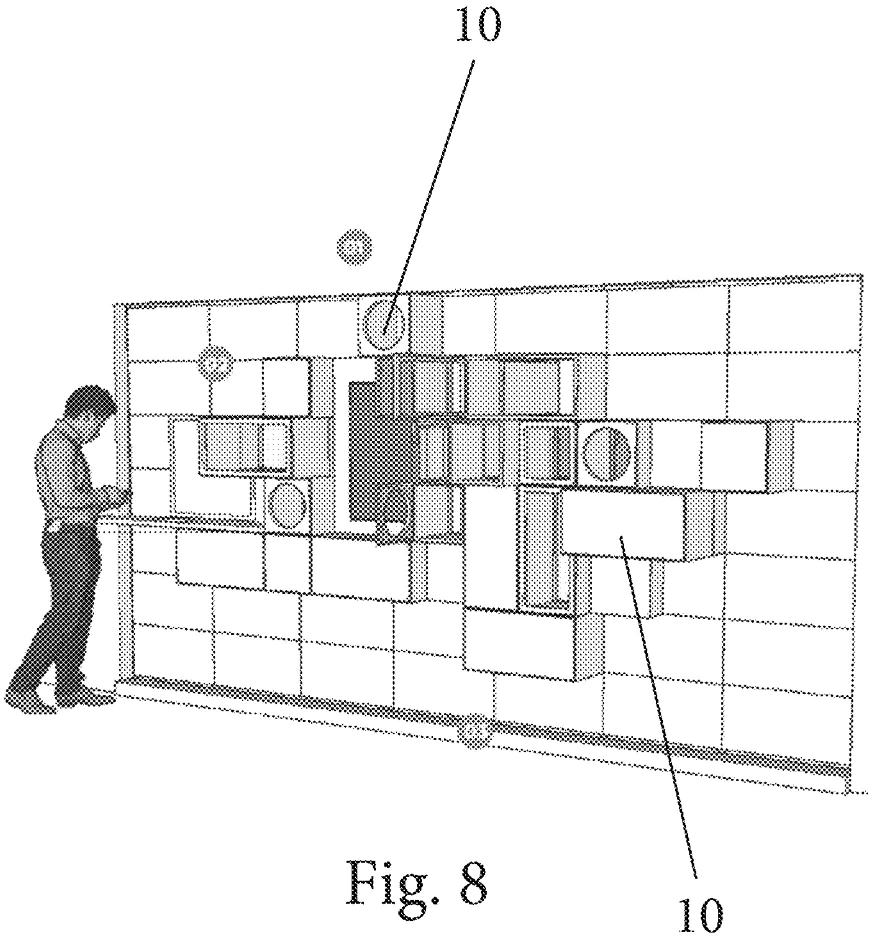
FIG. 8 is a front perspective view of an arrangement of the touchless modular containment system mounted to a wall.

FIG. 8 shows an arrangement of the touchless modular containment system mounted to a wall. FIG. 8 shows a front view with a customer interacting with his mobile phone in order to initiate the opening of a particular cubby 10 to retrieve his items. The interaction can be scanning of a QR code. The interaction can be entry of a code. The interaction can be an identification of the mobile device due to proximity to the wall. Other interactions can initiate the opening of a cubby. As will be appreciated the system includes software which cooperates with a hardware processor-based system to ensure that the cubbies are configured to provide access when an associated customer is identified, or, equivalently, when the customer's phone is identified (without identifying the customer himself or herself). The cubby 10 associated with that person can light up, open, or both.

Figure 9:
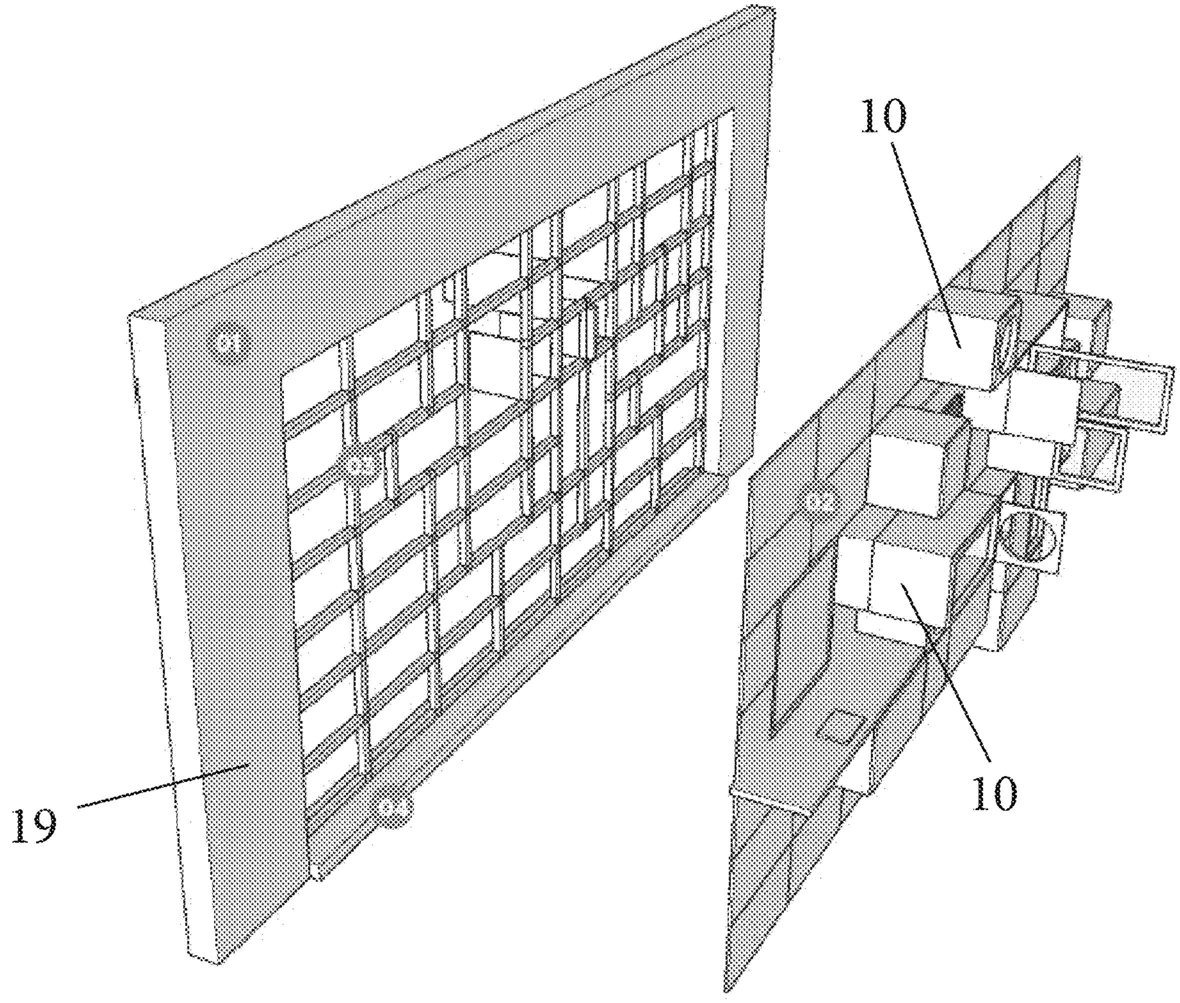
FIG. 9 shows an arrangement of cubbies in spaced relation to a skeleton.

In certain embodiments, after a period of time or detection of the removal of items, the cubby 10 can automatically close using the motor 22 (linear actuator 20) that had recently opened the cubby 10 for the user. A rear of the touchless modular containment system is used by employees of the store or restaurant to load items into predetermined cubbies. In accordance with an aspect of the disclosed system, A software subsystem can reference a product database and select a particular cubby having the correct size for the particular order that was made by a customer and identify that cubby to the employee, such as by lights or by opening the rear of the cubby. In this regard, the touchless modular containment system can select for the employee a cubby having dimensions appropriate for the order, and in this way, smaller cubbies can be selected for smaller orders, wider cubbies can be selected for particular orders (e.g., for a pizza), and so on. FIG. 9 shows the arrangement of cubbies 10 in spaced relation to a skeleton 19. The skeleton 19 can be understood as having been constructed to accommodate cubbies of different widths, heights, and both different heights and widths.

An arrangement of the touchless modular containment system can be mounted to a freestanding display, which, other than being freestanding, operates the same as arrangement of FIG. 9. A rear of the arrangement is used by employees of the store or restaurant to load items into predetermined cubbies. In this arrangement, since the structure is freestanding, the rear region or each cubby is secure to protect items awaiting retrieval.

Figure 10:
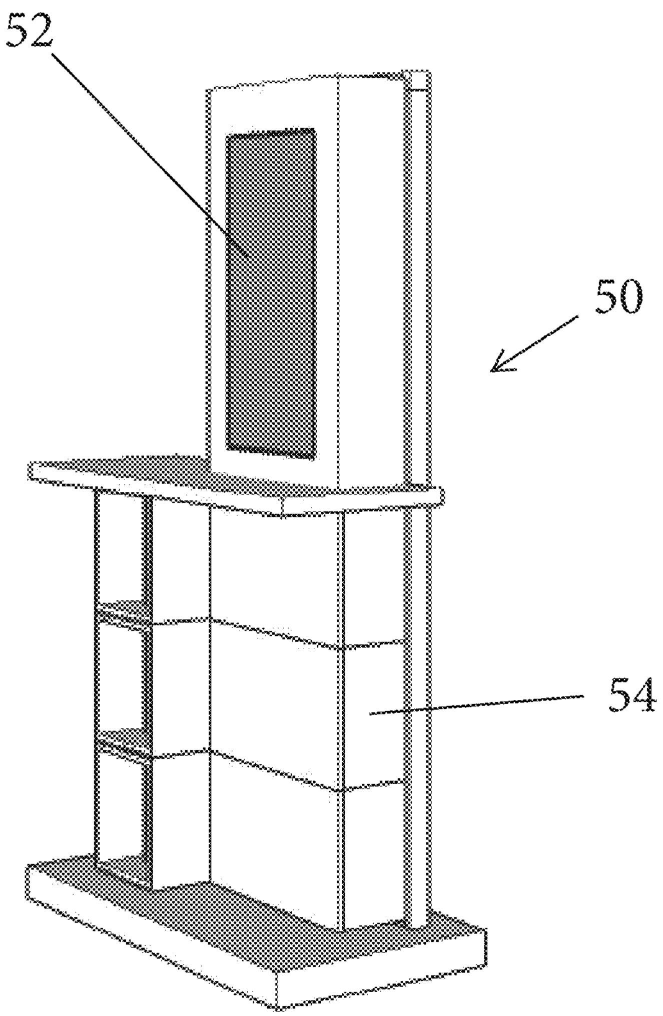
FIG. 10 is a perspective view of a kiosk that can be part of the touchless modular containing system.

FIG. 10 shows an exemplary kiosk 50 which can be part of systems in accordance with certain embodiments consistent with the disclosure. The kiosk 50 can include a touch screen 52 for customer interaction in the vicinity of the cubbies. The kiosk 50 can be constructed on a base 54 and have a skeletal support which provides a structure to which the touchscreen 52 can be combined with a number of cubbies 10 as part of a particular modular system consistent with the disclosure. The touchscreen 52 can be omitted in certain embodiments. The touchscreen 52 can be mounted separate from any cubbies in certain embodiments.

Touchless Modular Containment System (FIGS. 11-14)

Figure 11:
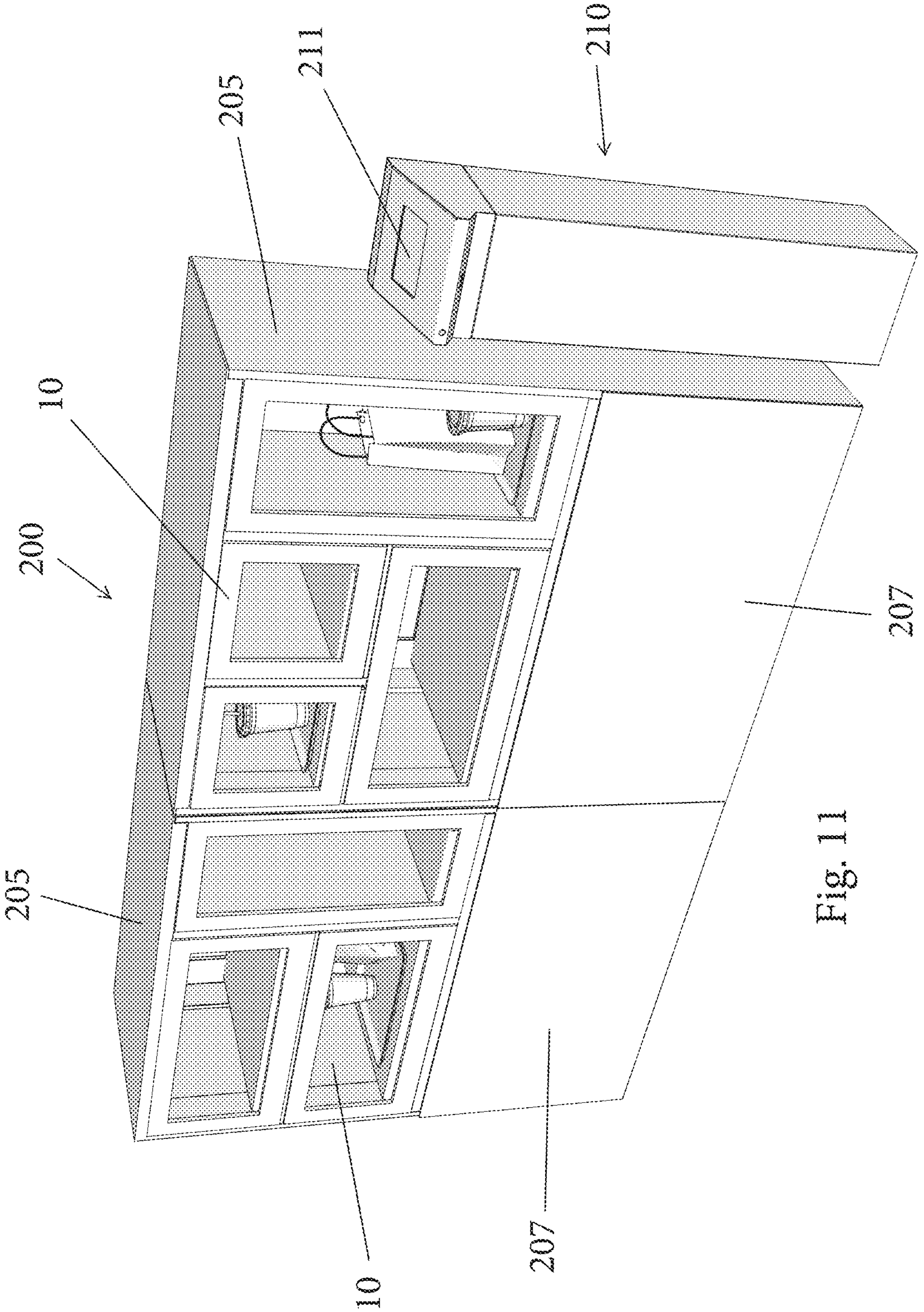
FIG. 11 is a front perspective view of a touchless modular containment system according to one embodiment with the cubbies being shown in closed positions.
Figure 12:
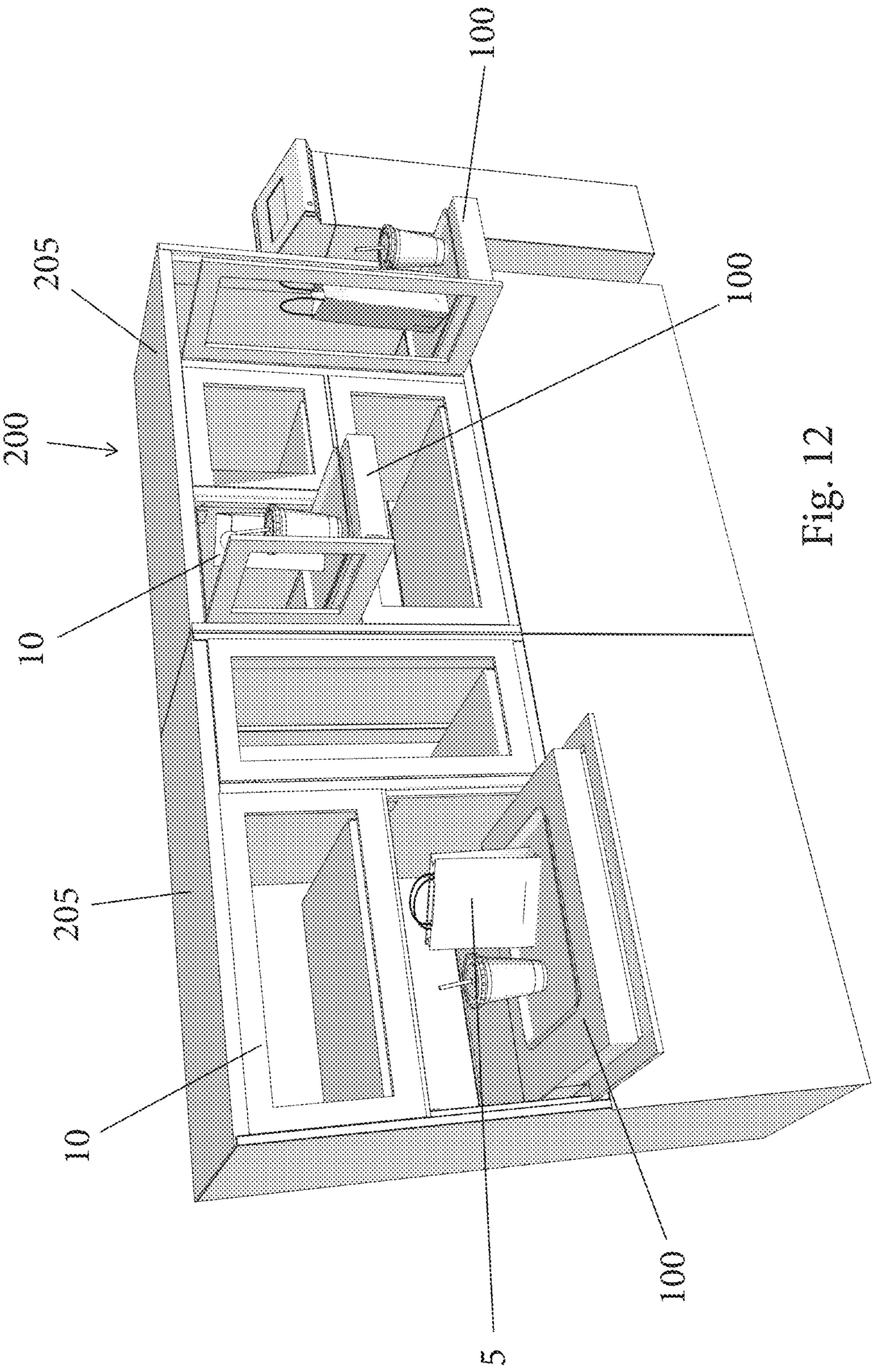
FIG. 12 is a front perspective view of the touchless modular containment system of FIG. 11 showing some of the cubbies in open positions.
Figure 13:
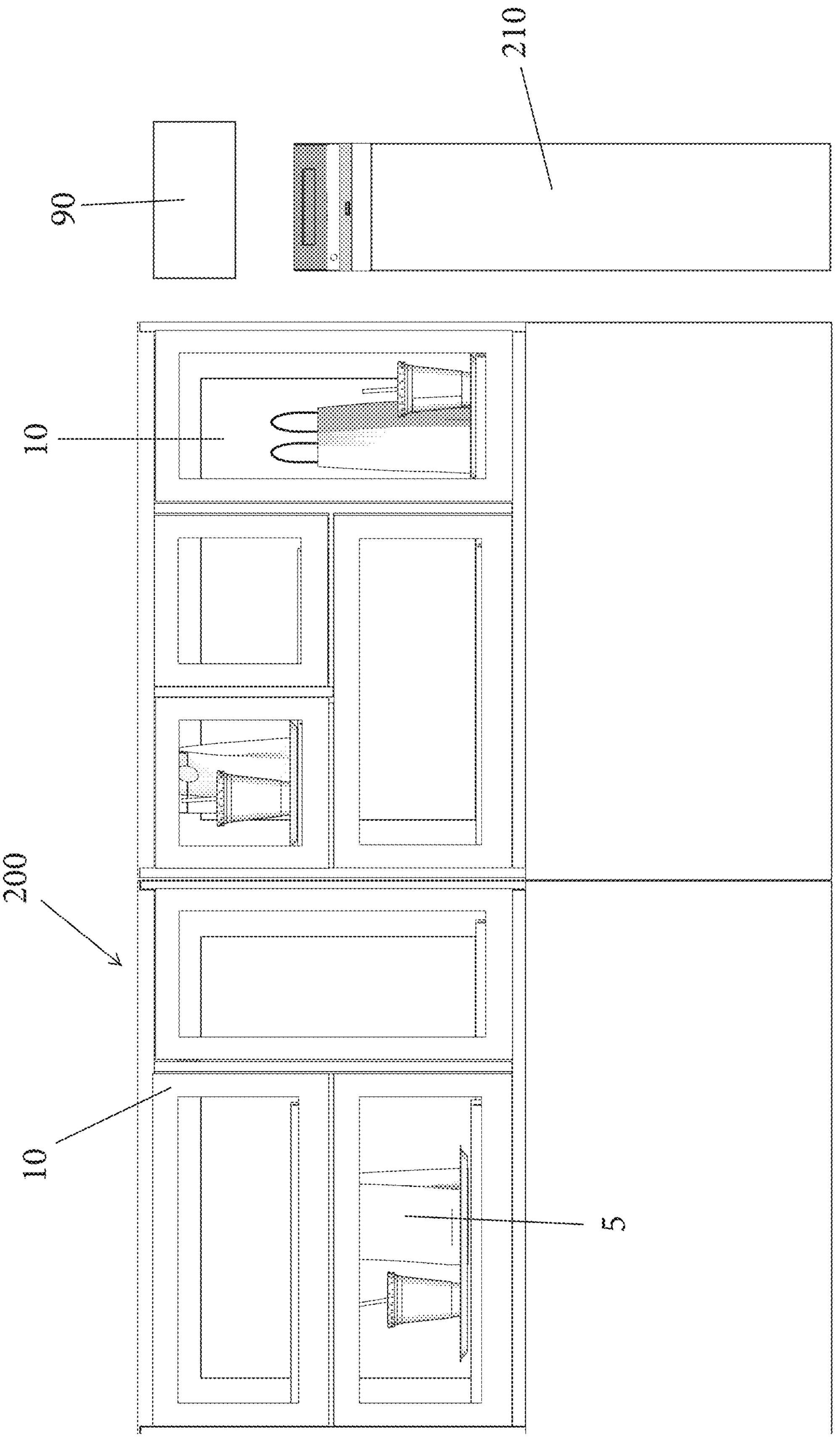
FIG. 13 is a front elevation view of the touchless modular containment system of FIG. 11.
Figure 14:
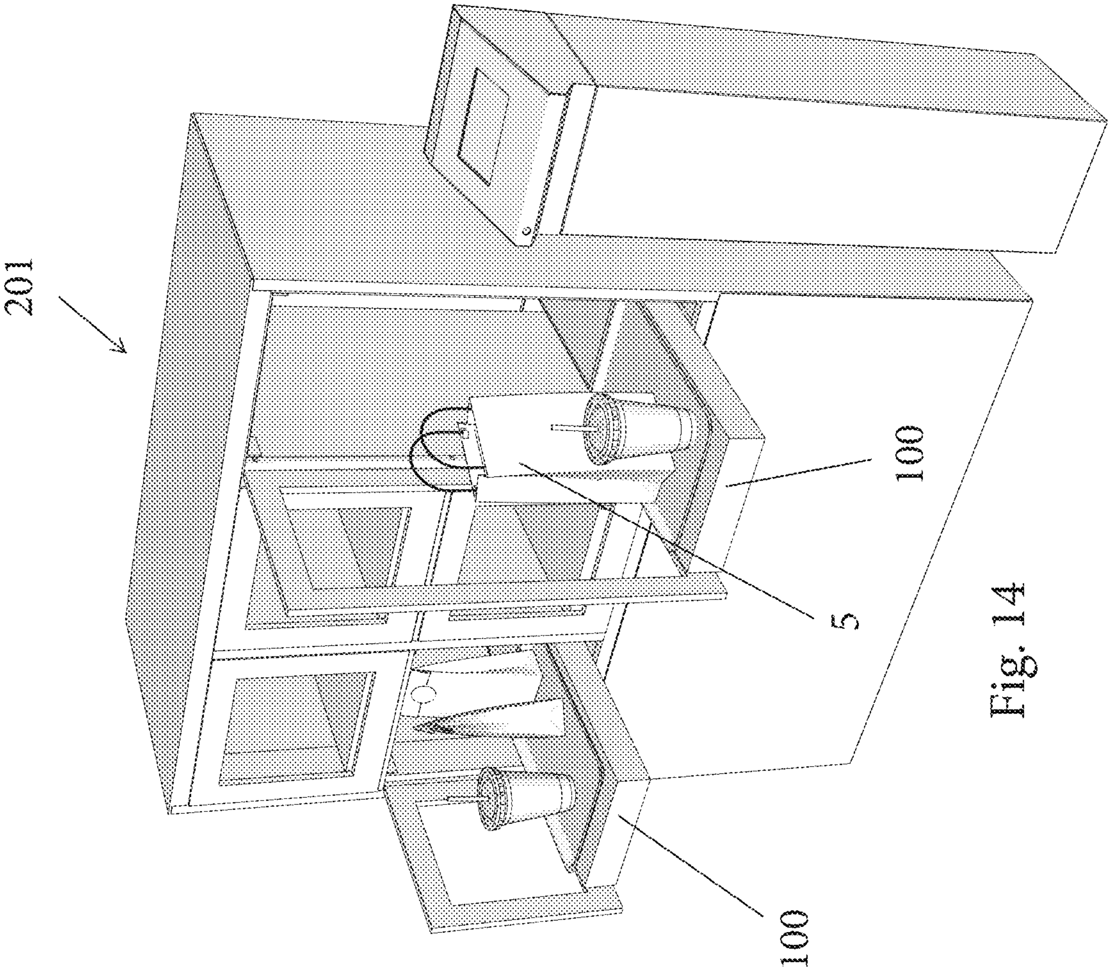
FIG. 14 is a front perspective view of a touchless modular containment system according to another embodiment with some of the cubbies being shown in open positions.

FIG. 11 is a front perspective view of a touchless modular containment system 200 according to a first embodiment in which a plurality of individual cubbies 10 are all in the closed positions. FIG. 12 shows at least some of the plurality of individual cubbies 10 in the open positions. FIG. 13 is a front elevation view of the touchless modular containing system 1000 with all of the plurality of individual cubbies 10 in the closed positions. FIG. 14 is a front perspective view of a touchless modular containment system 201 according to a second embodiment in which a plurality of individual cubbies 10 are in the open positions.

It will be appreciated that each of the touchless modular containment systems described herein are suitable for both pedestrian traffic or automobile traffic. In other words, in one embodiment, a pedestrian walks up to the touchless modular containment system, while in another implementation, the customer drives up to the touchless modular containment system.

As with the previous embodiments, each of the touchless modular containment system 200 and the touchless modular containment system 201 includes a kiosk 210 that includes a reader 211 that is able to detect the presence of the customer using any number of techniques based on different technologies. For example, the reader 211 can be an optic reader that is configured to read a unique optic code that is presented by the customer. In one implementation, the unique optic code is a QR code which is a type of matric barcode and is therefore a machine readable optical label. The QR code can be presented by the user in the form of a digital key that is displayed on a screen of the user's mobile device (smart phone, tablet, etc.) or alternatively, a printed QR code on paper can also be read. It will also be appreciated that other communication protocol can be used that allow the reader 211 to detect the presence of this unique customer. For example, Bluetooth technologies can also be used. In addition to a reader or as part thereof, the kiosk 210 can and preferably does include a touch screen for customer interaction in the vicinity of the cubbies 10.

Each of the touchless modular containment system 200 and the touchless modular containment system 201 can be made up on a plurality of modular cubby units 205 that can be connected to one another to form a larger modular connected system 200. For example, FIG. 11 shows two modular cubby units 205 that are positioned side-by-side and can be and preferably are connected to one another with the kiosk 210 being spaced and separate therefrom.

It will be appreciated that in one aspect of the present disclosure, the cubbies 10 that form a part of the modular cubby unit 205 can be non-uniform in that different sized cubbies 10 can be used. In FIG. 11, there are three different types of cubbies 10 being shown. More specifically, there are a plurality of smaller square shaped cubbies; one or more vertical cubbies; and one or more horizontal cubbies. The operation of all of the cubbies 10 is the same and therefore, the differences between the cubbies lies in the specifications (sizes) thereof.

The modular cubby unit 205 can include an integral base portion 207 that occupies the bottom of unit so that the cubbies are positioned at an appropriate height for an adult to access any one of the cubbies. Alternatively, the modular cubby unit 205 can be positioned on a support surface, such as a table, a pedestal, etc., and be secured thereto.

Figure 25:
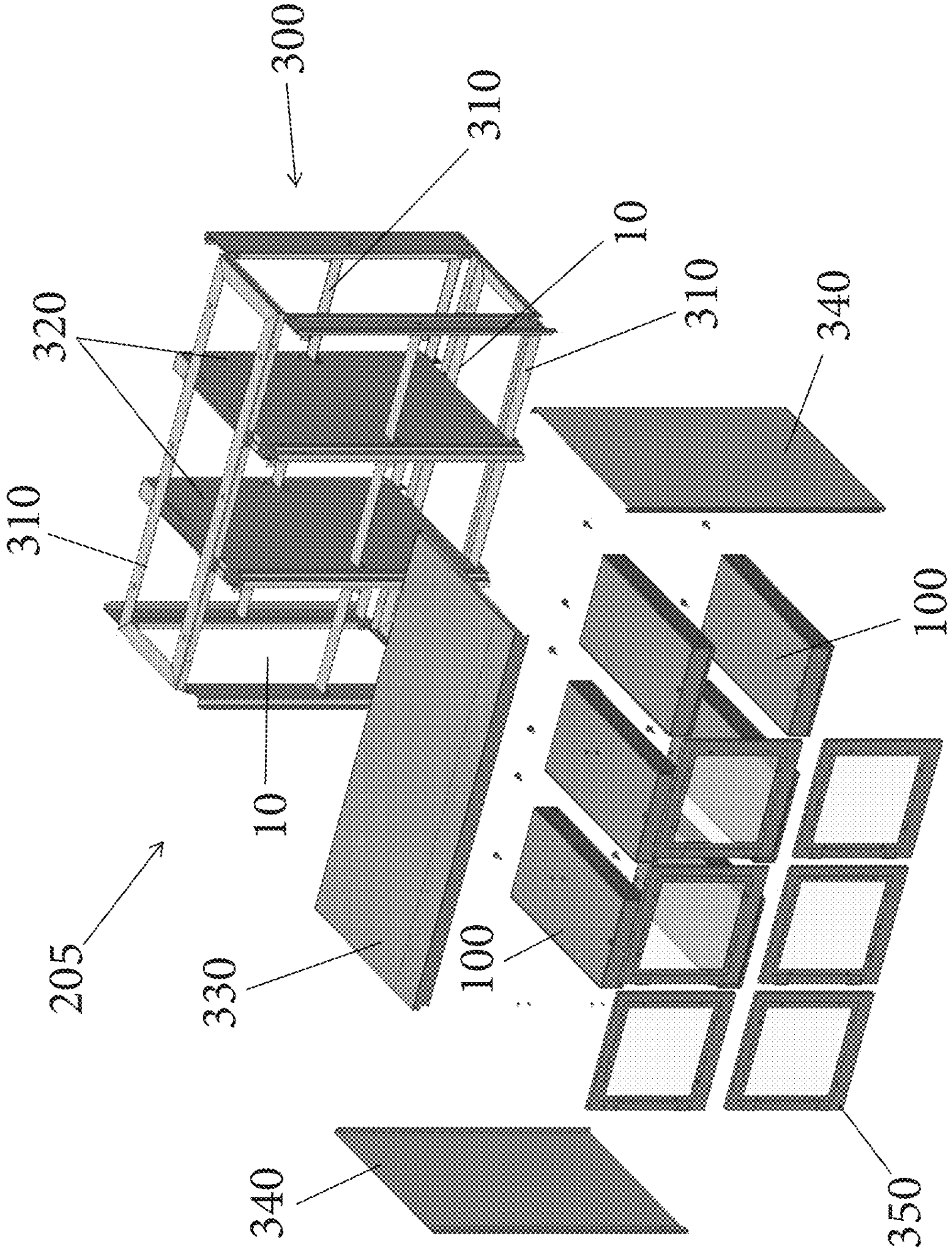
FIG. 25 is a front perspective view of a modular cubby unit that comprises a plurality of cubbies.
Figure 26:
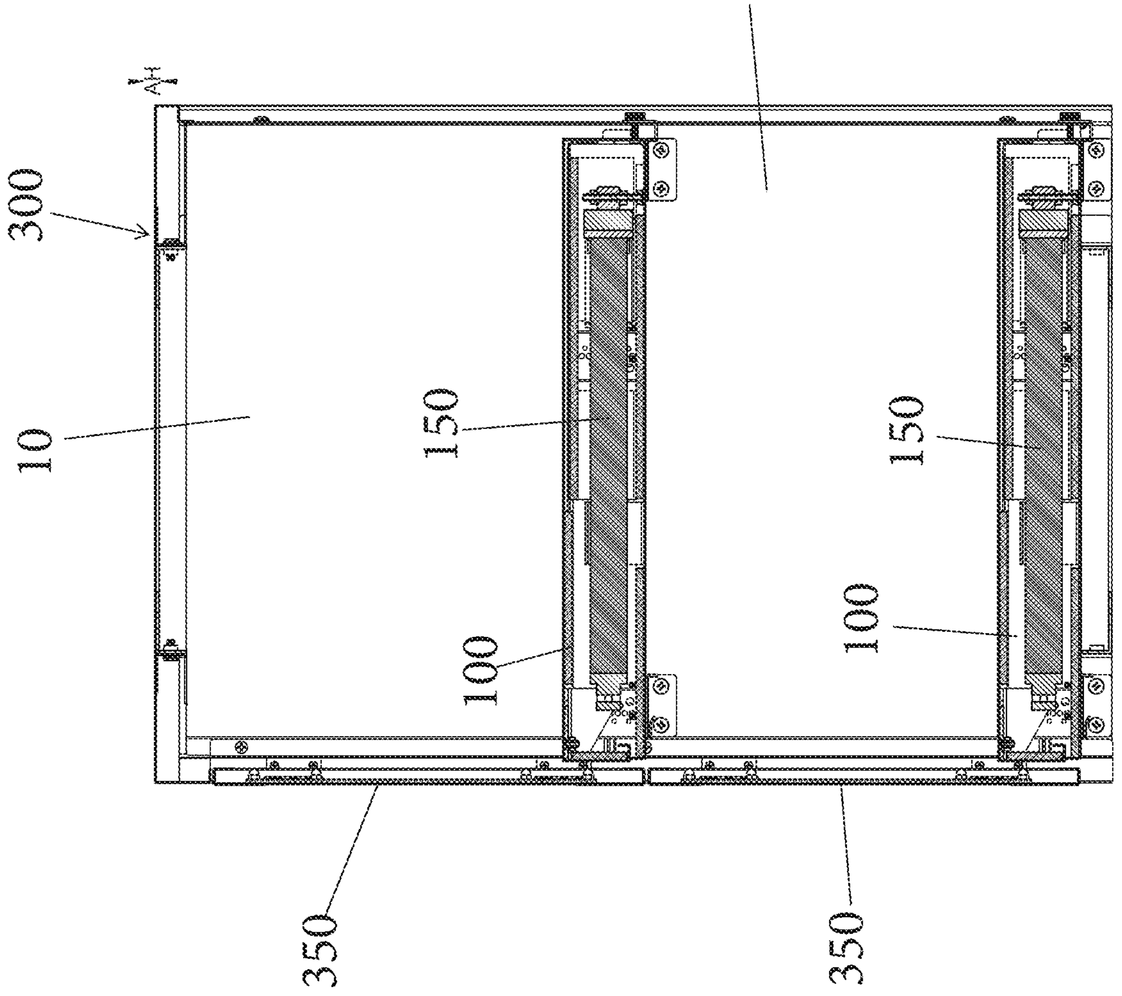
FIG. 26 is a cross-sectional view showing two stacked cubbies.
Figure 27:
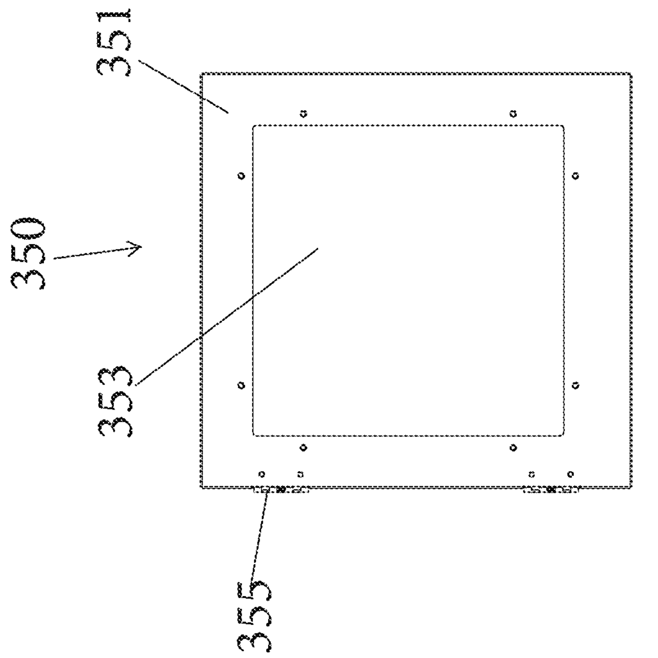
FIG. 27 is a front elevation view of a door of the cubby.

Modular Cubby Unit 205 (FIGS. 25-27)

As mentioned, the touchless modular containment system includes one or more modular cubby units 205 that comprise one or more and preferably a plurality of discrete cubbies 10.

FIG. 25 illustrates one exemplary modular cubby unit 205 that includes a frame sub-assembly 300 that defines the one or more cubbies 10. The frame sub-assembly 300 defines the support frame or skeleton of the modular cubby unit 205. The frame sub-assembly 300 includes a plurality of rails 310 that are oriented both horizontally and vertically to define the spaces for the cubbies 10. As shown, the frame sub-assembly 300 can include a divider wall 320 that separates one or more cubbies 10 from one or more adjacent cubbies 10. The rails 210 can be fixedly attached to the divider wall 320. The modular cubby unit 205 of FIG. 25 contains six cubbies 10 that are separated and secured relative to one another.

To complete the modular cubby unit 205, a top wall 330 is provided to seal and top off the modular cubby unit 205. In addition, end walls 340 can be provided to complete the ends of the modular cubby unit 205.

Each cubby 10 has a front door 350 that seals the cubby 10 prior to and after delivery of the article to the customer. The front door 350 typically includes an outer frame 351 and a transparent center panel 353 to allow the customer to see inside the cubby 10. The front door 350 can be attached to the frame sub-assembly 300 using traditional techniques, such as the use of hinges 355. As shown in the figures, the front door 350 can open in two different manners in that in one embodiment, the hinges 355 are oriented vertically along the left or right of the front door 350 to allow the front door 350 to open left to right or vice versa, while in another embodiment, the hinges 355 are oriented horizontally to allow the front door 350 to open up and down or vice versa. The hinges 355 are biased, such as spring biased, so that they cause the front door 350 to automatically return to the closed position once the opening force is removed. In other words, the hingers 355 cause the front doors 350 to be naturally biased to the closed positions.

Each front door 350 has its own lock mechanism to ensure that the front door 350 is locked at all times except when the article(s) is being delivered to the customer. Any number of door lock mechanisms can be used including magnetic door lock mechanisms. As mentioned herein, a magnetic based door lock can be used in which the front door 350 is locked when the magnet is energized and when the magnet is deenergized, the front door 350 can be open from the front.

In accordance with one embodiment, the front door 350 of each cubby 10 is recessed a sufficient distance so that a person cannot freely open the front door 350 since the peripheral edges of the front door 350 are recessed in the frame itself. The front door 350 has not handles or other hardware. In this embodiment, the door lock mechanism can consist of the use of a strong magnet since the customer does not have access to an edge of the front door 350. To open the front door 350, the magnetic attraction force is overcome by a driving action of the sliding drawer assembly as discussed herein. In this type of door lock mechanism, one magnetic pad can be placed on the surrounding frame, while another magnetic pad can be placed on the rear face of the front door 350 such that when the front door 350 is fully closed, the two magnetic pads are in contact with one another and the front door 350 is magnetically held in the closed state.

Sliding Drawer Assembly 100 (FIGS. 15-24)

Each of the dedicated cubbies 10 includes one sliding drawer assembly 100 that offers a touchless experience as described herein in that the item to be delivered to the customer (user) is placed on a sliding part of the sliding drawer assembly and then at a later time, the sliding part is signaled to automatically slide outward without user contact with the drawer.

Figure 15:
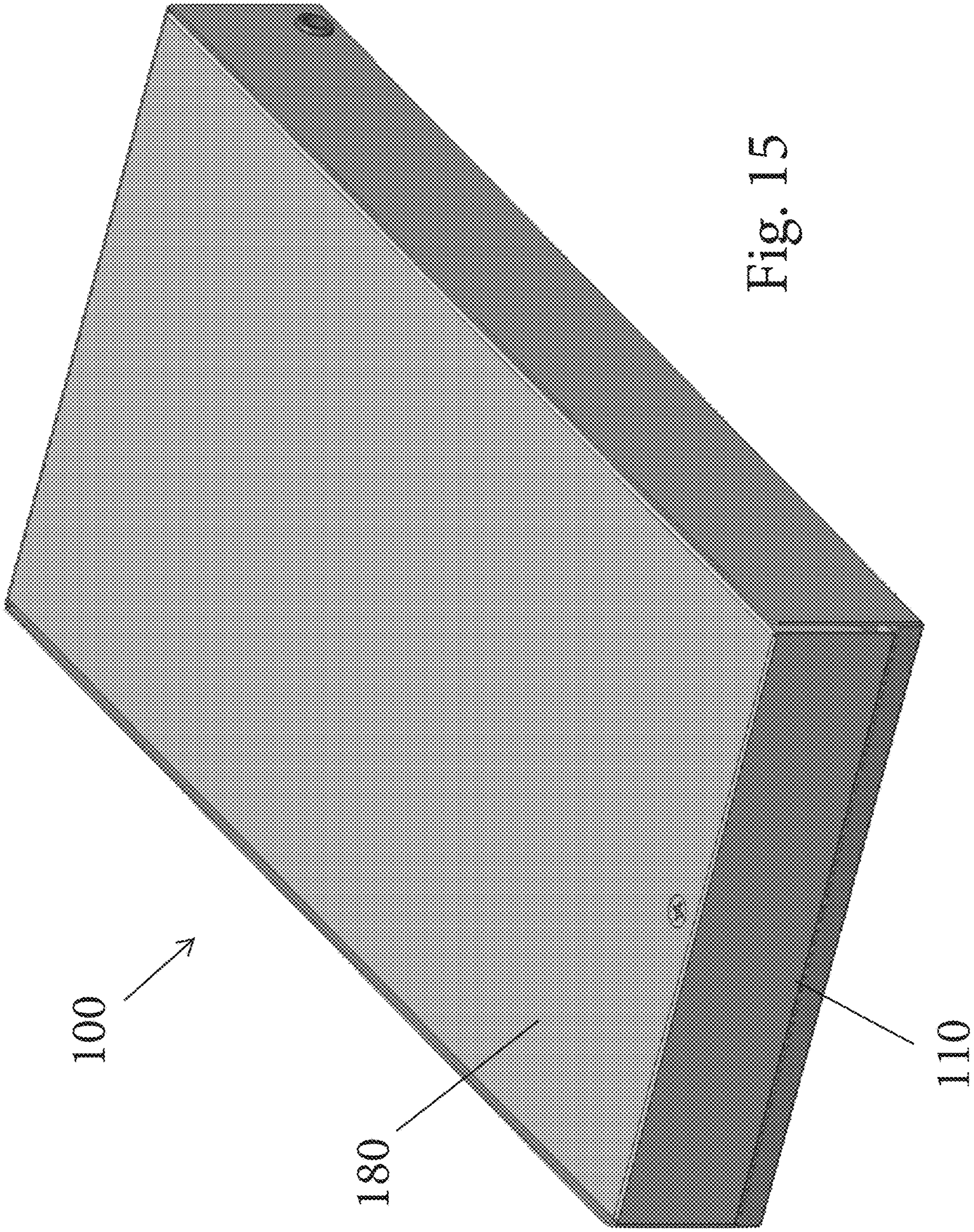
FIG. 15 is a top and front perspective view of a sliding drawer assembly that is part of one cubby.
Figure 16:
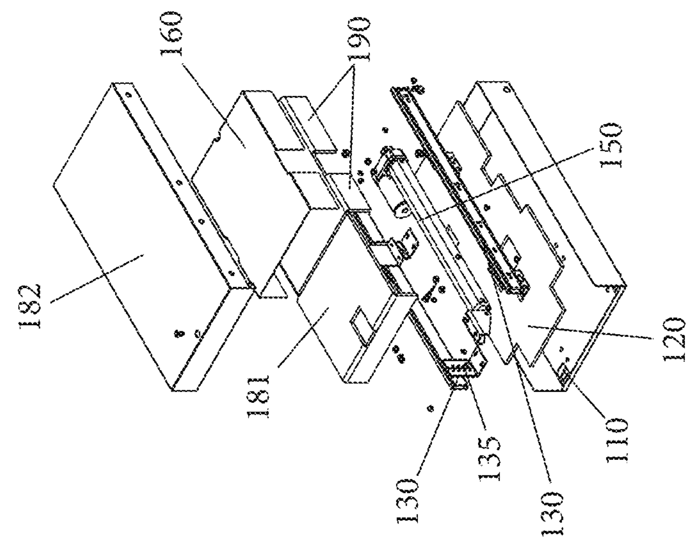
FIG. 16 is an exploded perspective view of the sliding drawer assembly.
Figure 17:
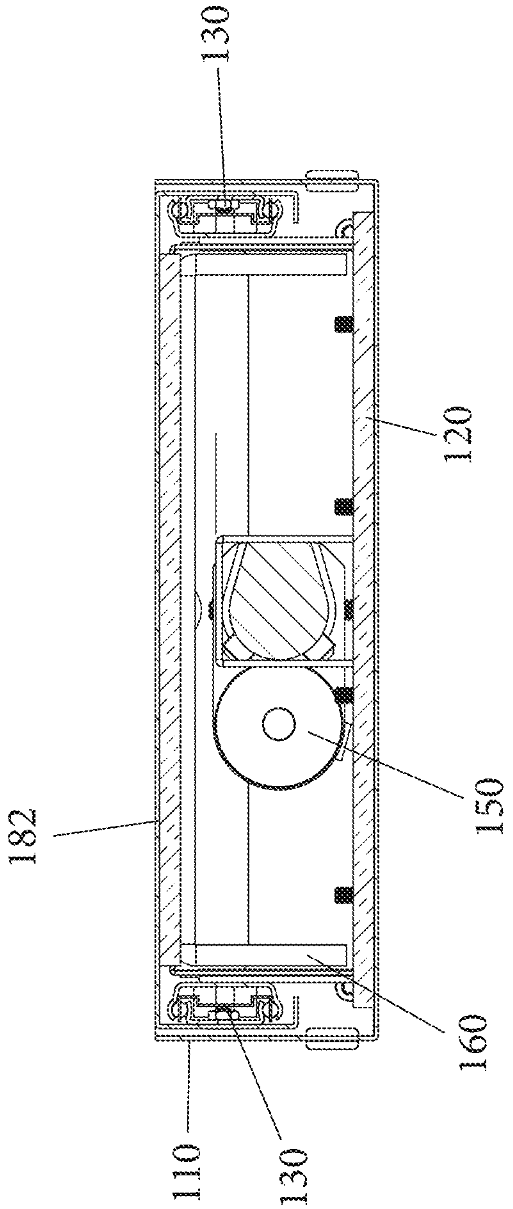
FIG. 17 is a cross-sectional view thereof.
Figure 19:
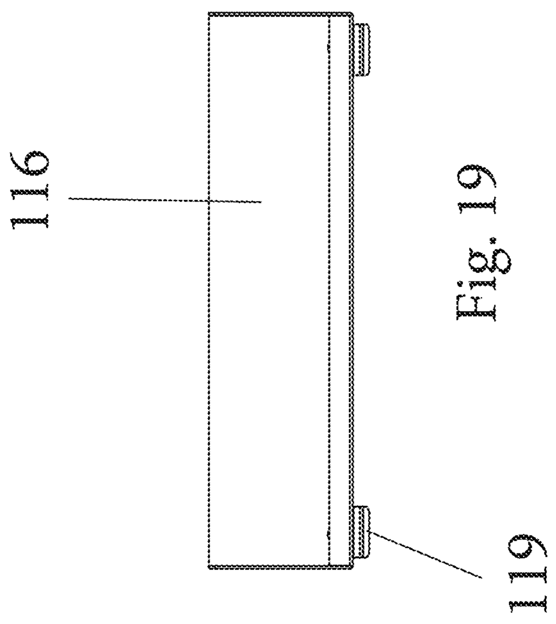
FIG. 19 is a front elevation view thereof.
Figure 18:
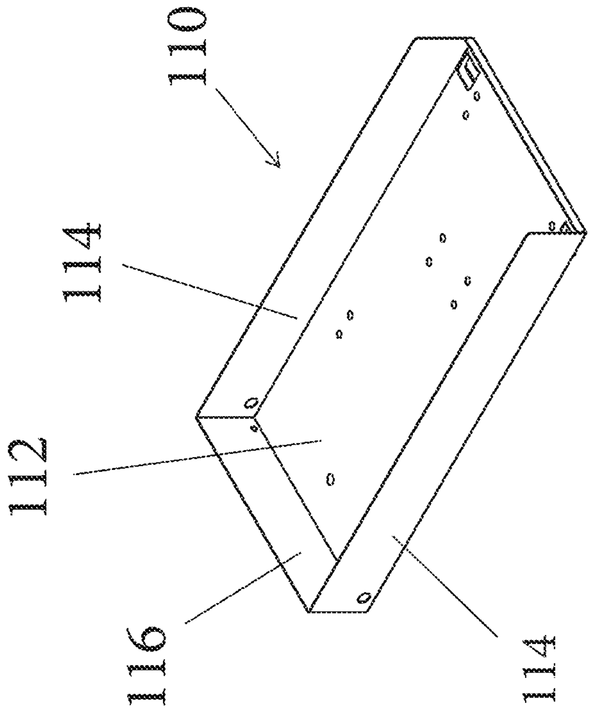
FIG. 18 is a top and side perspective view of a base tray of the sliding drawer assembly.
Figure 20:
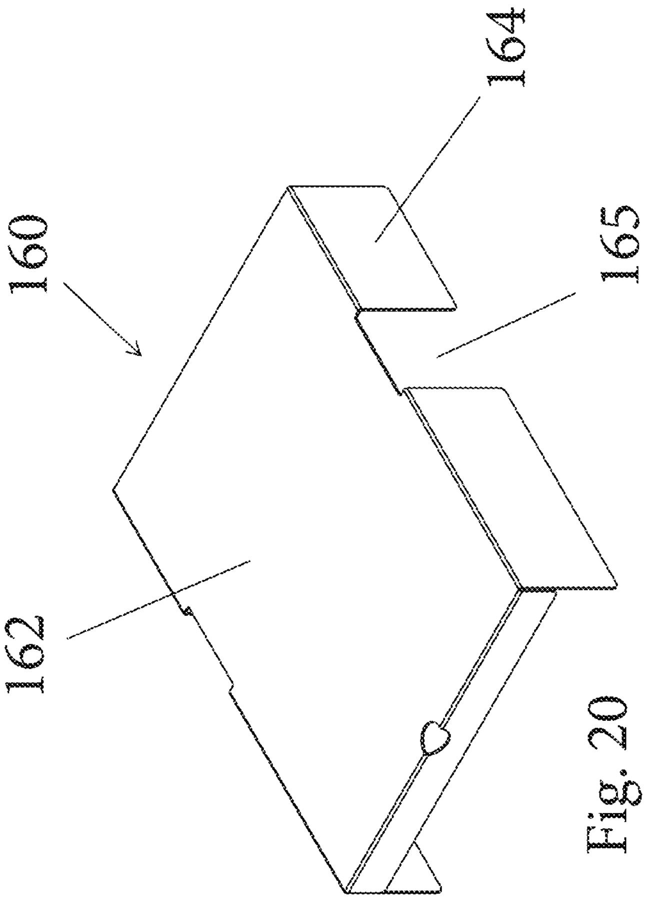
FIG. 20 is a top and side perspective view of a cover plate of the sliding drawer assembly.
Figure 21:
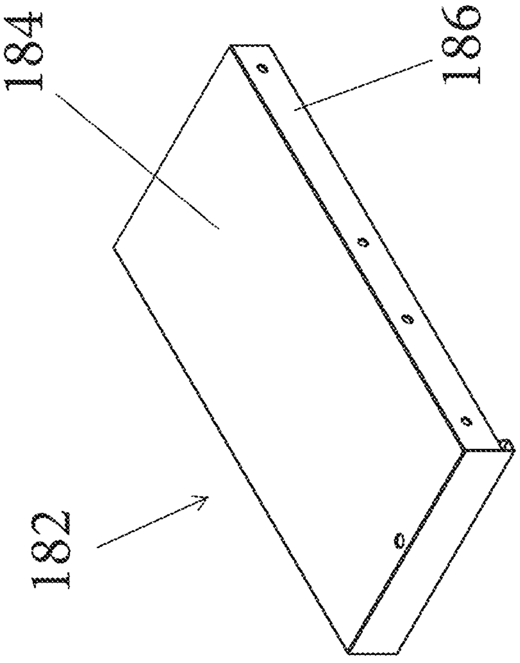
FIG. 21 is a top and side perspective view of one part of a drawer traveler of the sliding drawer assembly.
Figure 22:
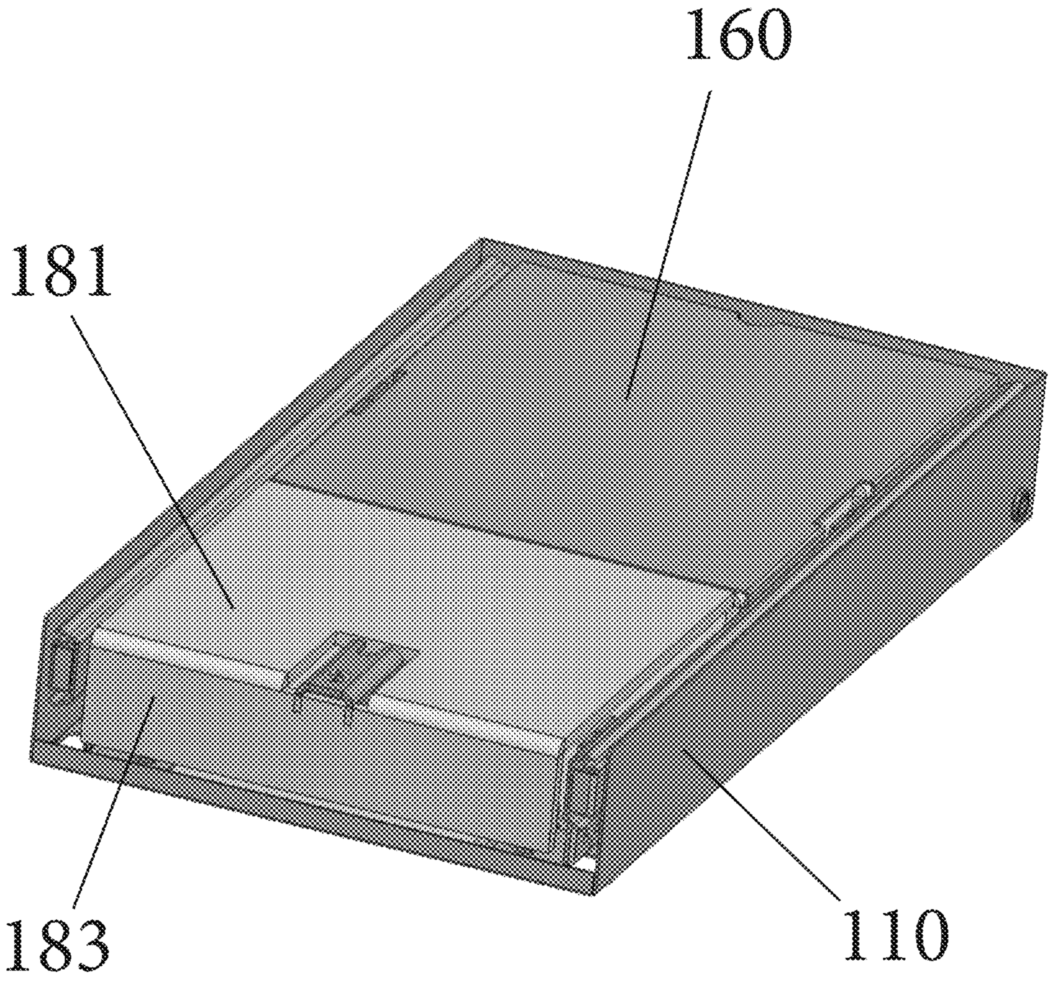
FIG. 22 is a top and front perspective view of a partially assembly of the sliding drawer assembly.
Figure 23:
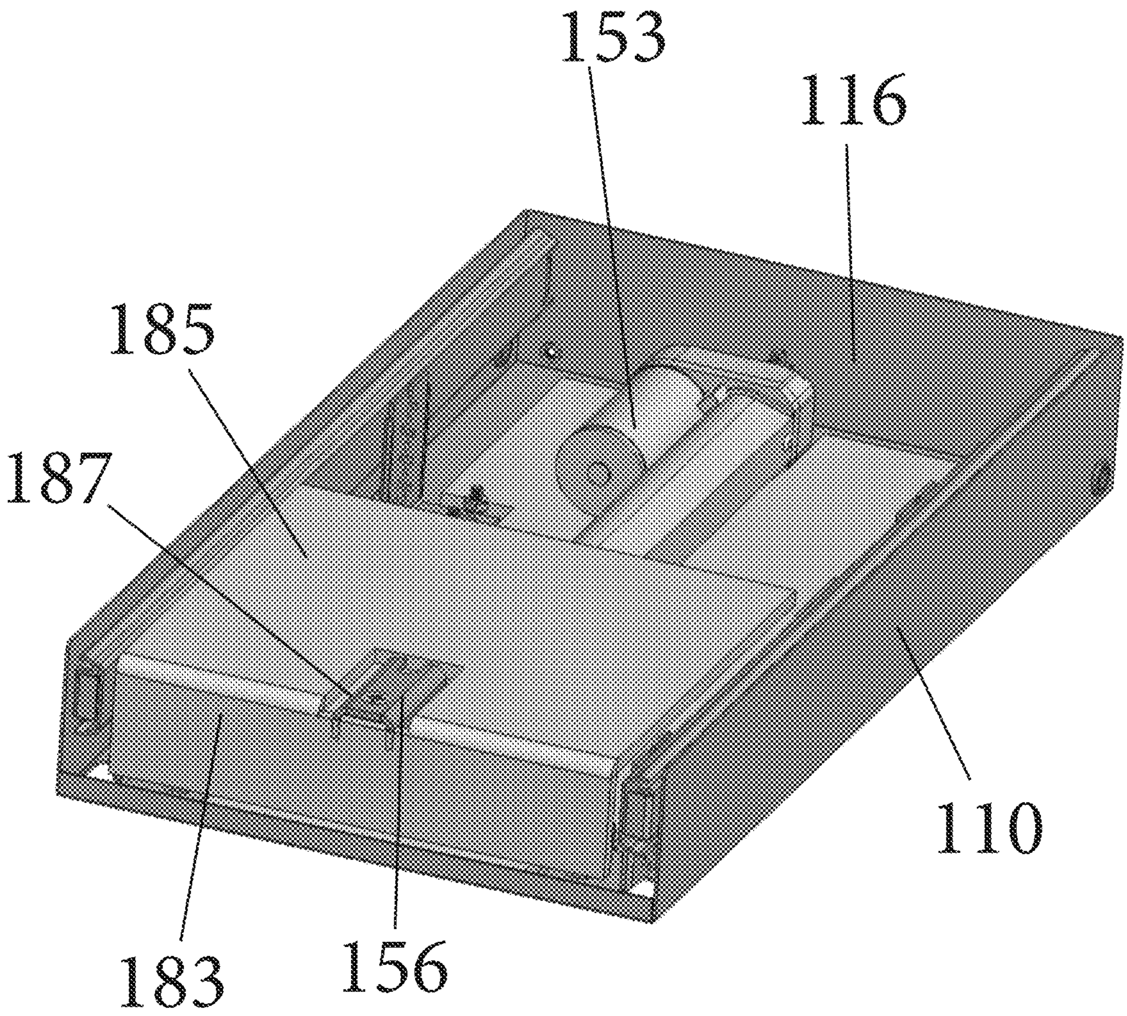
FIG. 23 is another top and front perspective view of a partially assembly of the sliding drawer assembly.
Figure 24:
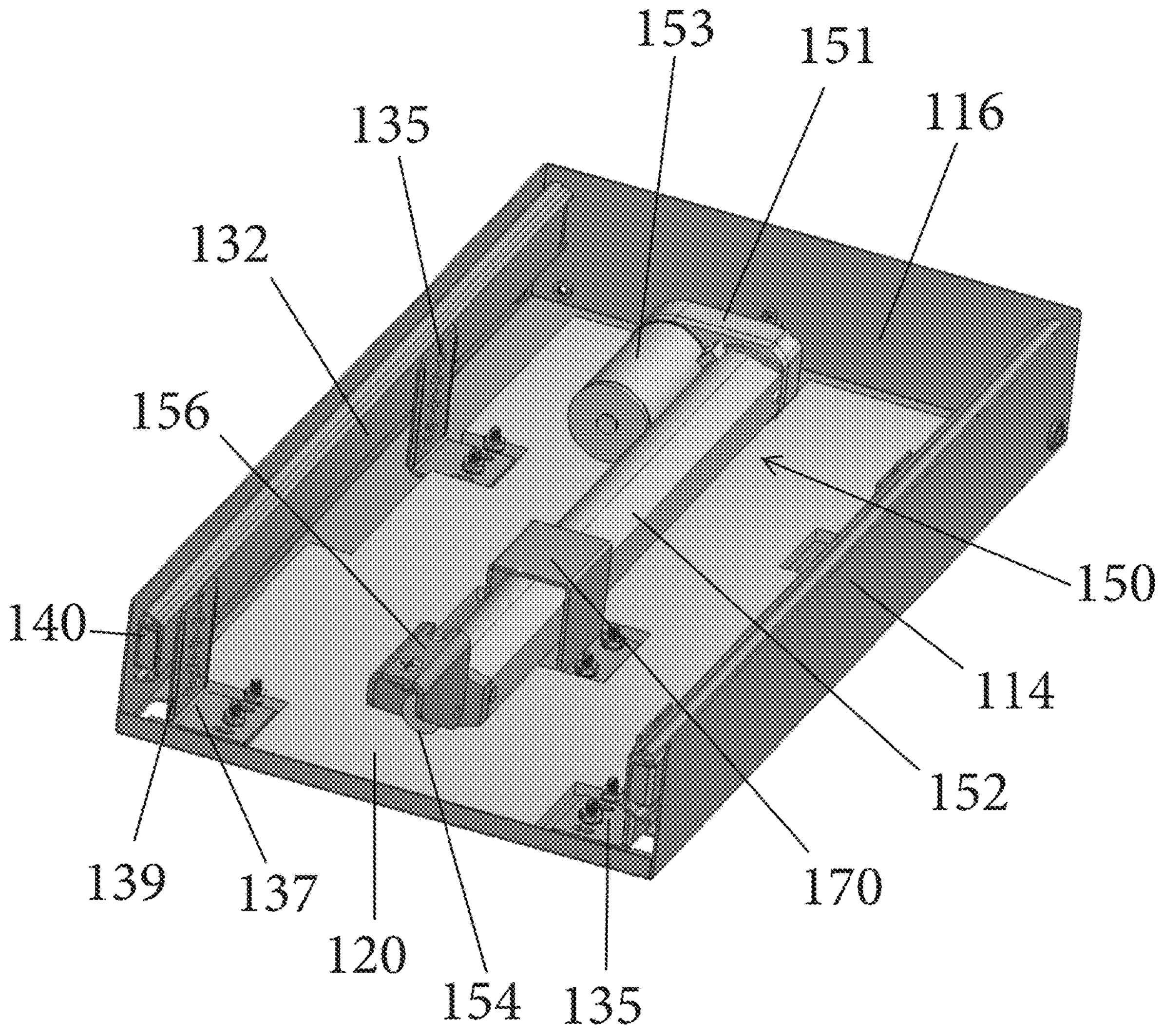
FIG. 24 is another top and front perspective view of a partially assembly of the sliding drawer assembly.

FIG. 15 shows the fully assembled sliding drawer assembly 100 includes a base tray 110 that is fixedly attached to the frame (skeleton) of the touchless modular containment system and thus, the base tray 110 does not move. As shown in FIGS. 18-19, the base tray 110 has a floor 112 and a pair of opposing side walls 114 that are parallel to one another. The base tray 110 includes openings that receive fasteners for attaching the base tray 110 to the frame. The illustrated base tray 110 is generally rectangular shape; however, other shapes are possible. The base tray 110 has a rear end wall 116 but does not include a front end wall and is thus completely open at the front. As with many of the components of the sliding drawer assembly 100, the base tray 110 can be formed of a suitable metal.

Along the underside of the floor 112 there can be pair of clips 119 located near the front edge of the floor 112. These clips 119 can be used to attach the sliding drawer assembly 100 to the cubby frame as described herein.

Along the floor 112 of the base tray 110 a first sound absorbing sheet 120 can be used. The first sound absorbing sheet 120 is cut to form and secured to the base tray 110 using conventional techniques, such as an adhesive or other bonding techniques, etc. As shown, the first sound absorbing sheet 120 has a plurality of cutouts formed therein.

The sliding drawer assembly 100 also includes a pair of undermount drawer slides 130 for controller movement of the sliding drawer assembly 100. There is thus a left drawer slide and a right drawer slide. Each of the drawer slides 130 includes a first fixed rail 132 that is fixedly attached to the base tray 110 as by one or more brackets 135 and preferably a plurality of brackets 135, such as two brackets 135 that are spaced longitudinally along the first fixed rail 132. As shown, the bracket 135 can be an L-shaped bracket 135 with a first leg 137 that is fixedly attached to the base tray 110 as by fasteners and a second leg 139 that is coupled to the first fixed rail 132 for supporting the first fixed rail 132 above the floor of the base tray 110. As shown, the first fixed rail 132 can have a C-shape.

The drawer slide 130 also includes a second sliding rail 140. The second sliding rail 140 is contained within the C-shaped first fixed rail 132 and is coupled to the main moving part (traveler) of the sliding drawer assembly 100 as described below. The attachment of the second sliding rail 140 to the main moving part (traveler) can be achieved using traditional fasteners or the like. The second sliding rail 140 freely slides within the first fixed rail 132. In general, any number of commercially available sliding mechanisms can be used, such as ball bearing style, roller style or hidden ball bearing style.

The sliding drawer assembly 100 also includes an actuator 150 that controllably moves the main moving part of the sliding drawer assembly 100 in a linear manner. The actuator 150 is operatively connected a main controller 90 for precise control over the actuator 150. Since there are multiple cubbies 10, each actuator 150 has a unique identifier that is stored in the main controller 90. The main controller 90 is generally shown in FIG. 13; however, it will be appreciated that is can be contained within the kiosk and/or the modular system.

As is known, the main controller 90 has a processor configured by code executing therein. The main controller 90 controls the various operations of the system as well as storing data and optionally storing measurements, etc.

In the illustrated embodiment, the actuator 150 comprises a linear actuator. As is known, a linear actuator is a device that pushes or pulls something in a linear direction or straight line. The rotational motion in its electric motors powered by electrical energy is what causes this motion. The (linear) actuator 150 includes an end plate 151, an elongated housing 152 that is mounted at one end to the end plate 151 and a motor 153 that is mounted to the end plate 151 adjacent the elongated housing 152. The elongated housing 152 and the motor 153 can be parallel to one another. Within the elongated housing 152, there is a sliding part which can be thought of as being a piston rod 154 that that is linearly driven by the operation (rotation) of the motor 153. With the elongated housing 152, there are piston seals and the like. At a distal end of the piston rod 154, there is a distal bracket 156 that is coupled to the piston rod 154 and is located above both the piston rod 154 and the elongated housing 152. The distal bracket 156 itself has a C-shape with two side walls connected to opposite sides of the piston rod 154 and a top wall extending between the two side walls. It is this distal bracket 156 that coupled the actuator 150 to the main moving part (traveler) of the sliding drawer assembly 100.

The power source of the motor 153 can be a wired electrical source or can be a battery contained within the interior of the sliding drawer assembly 100. In addition, the sliding drawer assembly 100 includes communications components, such as a receiver and transmitter that can communicate with the main controller to send control signals back and forth, etc.

As is known, the actuator 150 has a stroke length that defines the distance at which the main moving part (traveler) is extended. The actuator 150 thus has an extended position at which the piston rod 154 is extended and a retracted position in which the piston rod 154 is fully retracted.

To protect the actuator 150, there is a cover plate 160 for covering a portion of the actuator 150. The cover plate 160 has a top wall 162 and a pair of side walls 164. The illustrated cover plate 160 thus has a C-shape. Along each side wall 164 there is a cutout 165 that accommodates one of the brackets 135. The cover plate 160 is disposed over the motor 153 but does not cover the distal bracket 156.

A mounting bracket 170 can be used to mount the elongated housing 152 to the base tray 110. The mounting bracket 170 passes through a cutout formed in the first sound absorbing sheet 120.

The main moving part of the system on which one or more articles are placed is a traveler assembly 180 that comprises a first traveler part 181 and a second traveler part 182. The first traveler part 181 is the part of the traveler assembly 180 that is directly coupled to the actuator 150, while the second traveler part 182 overlies the first traveler part 181 and is coupled thereto.

As shown, the first traveler part 181 is in the form of an L-shaped plate with a front wall 183 and a top wall 185 that is joined to the front wall 183 at a 90 degree angle. There are no side walls. Along the front section of the front wall 183, there is an opening or cutout 187 that accommodates the distal bracket 156. The distal bracket 156 of the actuator 150 is the means by which the (linear) actuator 150 is coupled to the first traveler part 181. This coupling between the distal bracket 156 and the first traveler part 181 allows the linear motion of the piston rod 154 to be translated into linear motion of the traveler assembly 180. Fastener(s) can be used to couple the distal bracket 156 to the first traveler part 181.

In addition, the drawer slide 130 is also coupled to the traveler assembly 180 to provide smooth, controlled linear movement of the traveler assembly 180 between the extended and retracted positions. In particular, the second sliding rail 140 can be coupled to the first traveler part 181 and thus it slides when the first traveler part 181 is driven linearly by the actuator 150.

As shown, the tops of both the cover plate 160 and the first traveler part 181 are generally coplanar with one another. In the retracted position, the cover plate 160 and the first traveler part 181 are adjacent one another with facing edges thereof either being proximate or abutting one another. When extended, the first traveler part 181 travels outwardly away from the cover plate 160.

Alternatively, the second sliding rail 140 can be coupled to the second traveler part 182 (along side walls thereof) and thus it slides when the first traveler part 181 is driven linearly by the actuator 150 since the second traveler part 182 is coupled directly to the first traveler part 181 and moves as one.

The second traveler part 182 is larger than the first traveler part 181 and lies over both the first traveler part 181 and the cover plate 160. The second traveler plate 182 is fixedly coupled to the first traveler part 181 and therefore the two move together, while the second traveler part 182, like the first traveler part 181 is not attached to the cover plate 160 but rather the second traveler plate 182 slides over the first traveler part 181. The second traveler part 182 is meant to be readily and easily detached from the first traveler part 181 and therefore, a fastener or the like can be used to couple the two together.

The second traveler part 182 has a top wall 184, a pair of side walls 186 and a front wall 188. There is no rear wall since the rear of the second traveler part 182 is adjacent the rear end wall 116 of the base tray 110 and the second traveler part 182 needs to slide over the cover plate 160. The top wall 184 of the second traveler part 182 has an opening (hole) through which a screw can pass to couple the second traveler part 182 to the first traveler part 181.

Additional sound absorbing sheets 190 can be used within the sliding drawer assembly 100. For example, one sheet 190 can be placed along the front wall 183 of the first traveler part 180. There can be a plurality of sheets 190 that are placed along the side walls of the cover plate 160.

Openings can be provided to route cables and the like to the actuator 150.

FIG. 26 shows two stacked cubbies 10 with each cubby 10 having one sliding drawer assembly 100 that controls delivery of the article within the cubby 10 at the prescribed proper time.

Stocking of Cubbies

It will be appreciated that the touchless modular containment system 200 and the touchless modular containment system 201 are, in one embodiment, formed with an open rear in that the rears of all of the cubbies are completely open to allow a worker to place orders in a select one of the cubbies. Thus, the touchless modular containment system 200 and the touchless modular containment system 201 can be formed so that the kitchen is located along the rear thereof. The touchless modular containment system 200 and the touchless modular containment system 201 will be sealed relative to the kitchen so that the customer cannot access the kitchen and the kitchen is not subjected to the outside environment.

Alternatively, the rear of the touchless modular containment system 200 and the touchless modular containment system 201 can be closed off. For example, a common back wall can close off all of the cubbies. Alternatively, the rear of each cubby can be closed off with a lockable door.

In one embodiment, the kitchen worker selects the specific cubby to place the article(s) in based on the size of the article and the size of the cubby. Once the worker selects the cubby, the specific order is matched to the specific cubby in which it is placed. For example, a reader can be used to identify the order and the cubby in which the order is placed. This information is then saved in the operating system (in memory). Light indicators can be located along the rear to identify to the worker which cubbies are empty. For example, a green light can identify an empty cubby, while a red light can identify an occupied cubby.

In another embodiment, the operating system can select the cubby in which the order is to placed based on different criteria such as the size of the order, etc. For example, once an order is complete and packaged up, the worker can identify the order completeness to the operating system and then the operating system can select the cubby to which the order is to placed in. The operating system selects the cubby again based on the size of the order and the size of the cubby. The worker can be alerted on a display or the like which cubby is to be used for the order.

In yet another embodiment, the operating system can include an algorithm that will try to place different orders that are submitted in close proximity to one another in spaced apart cubbies to try to space the consumers apart from one another as they pick up the articles.

Delivery of Articles

As mentioned herein, the article(s) ordered by the customer is delivered automatically in a touchless manner in that the front door 350 of one designated cubby 10 is automatically opened when the customer arrives and the reader of the kiosk detects the presence of the customer. In the embodiment of FIGS. 25-27, the driving action of the sliding drawer assembly 100 and more particularly, the driving action of the traveler assembly 180 contacts and drives the front door 350 open as a result of the driving force of the traveler assembly 180 being greater than the magnetic force of the magnet door lock. Under the force of the linear actuator 150, the traveler assembly 180 is driven linearly in a forward direction and contact the front door 350 and continued forward movement causes the opening of the front door 350. The customer thus does not touch the front door 350 but instead the action of the sliding drawer assembly 100 is what opens the front door 350 and delivers the article to the customer.

As shown, in the extended position, the second traveler part 182 is advanced beyond the front face of the system and thus, the customer can lift the articles upward since they lie outside the inner confines of the cubby.

Automatic Closing of the Door

The software can be configured such that after the lapse of a prescribed period of time (e.g., 30 seconds), the front door 350 automatically closes by reverse movement of the motor 153 which results in retraction of the piston rod 154, whereby the traveler assembly 180 is retracted into the cubby.

Additional Sensor(s)

In addition, other sensors, such as motion sensors and the like can be incorporated into the system to assist in the closing of the front door.

In addition, a weight sensor can be incorporated into the sliding drawer assembly 100 to detect whether any article remains on the traveler assembly 180 after the front door 135 closes due to the expiration of the prescribed time period. For example, if weight is detected after the front door 135 closes, the main controller 90 receives such positive reading from the weight sensor and logs in memory that the article was not retrieved. The system can be configured to allow the customer to make another attempt at retrieval of the article in that scanning the unique identifier at the reader will result in the opening of the front door 350.

The weight sensor can be a located over a patch of the second traveler part or can be located below such structure.

Main Controller 90

As discussed herein, the system 200, 201 as well as those other system(s), described herein, are part of a computer implemented system in that the main controller 90 is used to control the various communications between the customer and the system. More specifically, as mentioned, the kiosk is in communication with each of the sliding drawer assemblies 100 since when the customer identifies himself/herself at the kiosk by providing a unique code, such as a QR code, the main controller then instructs one specific sliding drawer assembly 100 to operate causing the traveler assembly 180 to move linearly in a forward direction. As mentioned, the forward movement of the traveler assembly 180 contacts and drives the front door 350 open. The door lock mechanism is overcome by the driving force of the traveler assembly 180 resulting in the front door 350 pivoting open.

Other Messages

In the event that the customer arrives at the kiosk and the order is not ready for pickup, the customer can be alerted at the kiosk and/or over the mobile device that the order is not ready. For example, a message such as "Order still being prepared" can be displayed to the customer.

Customization of Modular Cubby Units

As described herein, the framework that supports the modular cubby units is easily customizable to provide cubbies of the desired sizes and/or desired layout. Since or more modular cubby units can be connected to one another to form a larger unit, one modular cubby unit can be easily removed and replaced, while the others remain in place. In this way, the entire system does not have to taken offline to make a repair and/or modification to one modular cubby unit. Similarly, a replacement modular cubby unit can be brought in to replace the one being removed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A touchless modular containment system for delivering one or more articles to a person, comprising:

a modular frame that defines a plurality of discrete cubbies, each cubby having a front door that is coupled to the modular frame and opens outwardly to provide access to the cubby; and a plurality of sliding drawer assemblies, each cubby containing one sliding drawer assembly, the sliding drawer assembly having a base tray that is secured to the modular frame, the sliding drawer assembly having a movable traveler assembly that defines a top surface of the sliding drawer assembly and moves between a fully extended position and a fully retracted position, the slider drawer assembly including an actuator for linearly moving the movable traveler assembly between the fully extended position and the fully retracted position;

wherein a front of the traveler assembly is positioned relative to and adjacent the front door such that forward driving of the traveler assembly toward the fully extended position opens the front door by the traveler assembly urging the front door open without any interaction between the person and the front door.

2. The touchless modular containment system of claim 1, wherein in the fully extended position of the traveler assembly, the front door is fully opened and is located completely below or completely to one side of the traveler assembly.

3. The touchless modular containment system of claim 1, wherein a front face of the front door is recessed relative to a front face of the modular frame to prevent external opening of the front opening without use of the actuator.

4. The touchless modular containment system of claim 3, wherein the front door is maintained in a closed position by a magnetic lock that is overcome by a driving force of the traveler assembly.

5. The touchless modular containment system of claim 4, wherein the magnetic lock comprises a permanent magnet disposed along one of a rear surface of the front door and the modular frame, the driving force of the traveler assembly being greater than a magnetic force of the permanent magnet.

6. The touchless modular containment system of claim 1, wherein the traveler assembly includes a first traveler part and a second traveler part that completely overlies the first traveler part and is fixedly attached to the first traveler part, the second traveler part defining the top surface of the sliding drawer assembly.

7. The touchless modular containment system of claim 6, wherein the actuator comprises a linear actuator with an extendable piston rod, a distal end of the piston rod being coupled to the first traveler part, the first traveler part riding along linear drawer slides located along opposite sides of a base tray of the sliding drawer assembly.

8. The touchless modular containment system of claim 6, wherein the first traveler part comprising an L-shaped plate and the sliding drawer assembly further includes a cover plate that is secured to the base tray and covers a motor of the actuator, wherein in the fully retracted position, a rear edge of the first traveler part abuts a front edge of the cover plate.

9. The touchless modular containment system of claim 8, wherein the base tray has an open front and the second traveler part has a front wall that is positioned forward and adjacent to a front wall of the first traveler part, the front wall of the second traveler part closing off the open front of the base tray.

10. The touchless modular containment system of claim 1, further including a kiosk with a reader that is configured to read a unique identifier that is associated with one order that comprises one or more articles, the kiosk being in communication with the actuators of the plurality of sliding drawer assemblies, wherein a main controller of the kiosk is configured such that when one unique identifier is read by the reader, the cubby that contains the order is identified and the actuator of the sliding drawer assembly associated with the identified cubby is operated to cause forward movement of the traveler assembly and opening of the front door of the cubby.

11. The touchless modular containment system of claim 10, wherein the unique identifier comprises a QR code.

12. The touchless modular containment system of claim 1, wherein the slider drawer assembly has a box shape with coupling members for detachable attachment to the modular frame within one cubby.

13. The touchless modular containment system of claim 12, wherein the coupling members comprise hooks at a front edge of the base tray of the slider drawer assembly.

14. The touchless modular containment system of claim 1, wherein the modular frame includes a plurality of rails that connect to end frame members and to divider walls so as to define the plurality of discrete cubbies, with at least one cubby of the plurality of discrete cubbies being located directly above another cubby of the plurality of the discrete cubbies, the base tray of the sliding drawer assembly of the one cubby defining a ceiling of the other cubby that is located directly below the one cubby, the front doors being hingedly coupled to the modular frame.

15. The touchless modular containment system of claim 14, wherein the plurality of rails include for each cubby a front horizontal rail and a rear horizontal rail that is coplanar with the front horizontal rail with an open space between the front horizontal rail and the rear horizontal rail, each sliding drawer assembly having a box shape with a front of the base tray lying on and being supported by the front horizontal rail and a rear of the base tray lying on and being supported by the rear horizontal rail.

16. A touchless modular containment system for delivering one or more articles to a person, comprising:

a modular frame that defines a plurality of discrete cubbies, each cubby having a front door that is coupled to the modular frame and opens outwardly to provide access to the cubby; and a plurality of sliding drawer assemblies that are detachably secured to the modular frame, each cubby containing one sliding drawer assembly, the sliding drawer assembly having a base tray that is fixedly secured to the modular frame, the sliding drawer assembly having a movable traveler assembly that defines a top surface of the sliding drawer assembly and moves between a fully extended position and a fully retracted position;

wherein a front of the traveler assembly is positioned relative to and adjacent the front door such that forward driving of the traveler assembly toward the fully extended position opens the front door by the traveler assembly urging the front door open without any interaction between the person and the front door;

wherein the modular frame includes a plurality of rails that connect to end frame members and to divider walls so as to define the plurality of discrete cubbies, with at least one cubby of the plurality of discrete cubbies being located directly above another cubby of the plurality of the discrete cubbies, the base tray of the sliding drawer assembly of the one cubby defining a ceiling of the other cubby that is located directly below the one cubby, the front doors being hingedly coupled to the modular frame;

wherein the plurality of rails include for each cubby a front horizontal rail and a rear horizontal rail that is coplanar with the front horizontal rail with an open space between the front horizontal rail and the rear horizontal rail, each sliding drawer assembly having a box shape with a front of the base tray lying on and being supported by the front horizontal rail and a rear of the base tray lying on and being supported by the rear horizontal rail.

* * * * *